United States Patent
Lee et al.

(10) Patent No.: US 10,089,060 B2
(45) Date of Patent: Oct. 2, 2018

(54) DEVICE FOR CONTROLLING SOUND REPRODUCING DEVICE AND METHOD OF CONTROLLING THE DEVICE

(71) Applicant: SAMSUNG ELECTRONICS CO., LTD., Suwon-si, Gyeonggi-do (KR)

(72) Inventors: Yong-woo Lee, Hwaseong-si (KR); Jong-min Kim, Suwon-si (KR); Se-young Oh, Suwon-si (KR); Hun-sok Oh, Suwon-si (KR); Hee-chul Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 76 days.

(21) Appl. No.: 14/938,177

(22) Filed: Nov. 11, 2015

(65) Prior Publication Data
US 2016/0170708 A1   Jun. 16, 2016

(30) Foreign Application Priority Data

Dec. 15, 2014 (KR) .......................... 10-2014-0180496

(51) Int. Cl.
*G06F 17/00* (2006.01)
*G06F 3/16* (2006.01)
(Continued)

(52) U.S. Cl.
CPC .............. *G06F 3/165* (2013.01); *G06F 3/017* (2013.01); *H04R 1/1041* (2013.01); *G08C 2201/32* (2013.01); *H04R 2420/07* (2013.01)

(58) Field of Classification Search
CPC ............ G08C 2201/32; G08C 2201/91; G08C 2201/93; G06F 3/017; G06F 3/0346;
(Continued)

(56) References Cited

U.S. PATENT DOCUMENTS

| 8,150,384 B2 | 4/2012 | Abifaker et al. |
| 8,155,667 B2 | 4/2012 | Jang et al. |

(Continued)

FOREIGN PATENT DOCUMENTS

| CN | 102473040 A | 5/2012 |
| KR | 10-2004-0063153 | 7/2004 |

(Continued)

OTHER PUBLICATIONS

Extended European Search Report dated Apr. 29, 2016 in counterpart European Patent Application No. 15199253.4.

(Continued)

*Primary Examiner* — Thomas Maung
(74) *Attorney, Agent, or Firm* — Nixon & Vanderhye P.C.

(57) ABSTRACT

A device and method of controlling a sound reproducing device are disclosed. The device includes a communication unit, which transmits and receives data to and from the sound reproducing device; a sensing unit, which detects a motion of the device and obtains azimuth information regarding an azimuth pointed by a pre-set region of the device based on the motion; and a control unit, which receives the azimuth information regarding the sound reproducing device from the sound reproducing device via the communication unit and, if it is determined that the azimuth information regarding the device corresponds to the azimuth information regarding the sound reproducing device within a pre-set range, determines the sound reproducing device as a controlled device.

17 Claims, 20 Drawing Sheets

(51) Int. Cl.
*G06F 3/01* (2006.01)
*H04R 1/10* (2006.01)

(58) Field of Classification Search
CPC ......... G10H 1/0008; H04N 2005/4428; H04N 21/42204; H04N 21/42222; H04W 4/008
See application file for complete search history.

(56) References Cited

U.S. PATENT DOCUMENTS

| | | |
|---|---|---|
| 8,232,859 B2 | 7/2012 | Hou et al. |
| 9,253,592 B1 * | 2/2016 | Moscovich ........... H04W 4/008 |
| 2003/0095154 A1 | 5/2003 | Colmenarez |
| 2004/0247138 A1 | 12/2004 | Wang |
| 2010/0001893 A1 * | 1/2010 | Kim ...................... G08C 17/02 |
| | | 341/176 |
| 2012/0110517 A1 | 5/2012 | Sparks et al. |
| 2012/0117249 A1 | 5/2012 | Jung et al. |
| 2012/0169482 A1 * | 7/2012 | Chen ...................... G08C 17/02 |
| | | 340/12.52 |
| 2012/0321112 A1 | 12/2012 | Schubert et al. |
| 2013/0147612 A1 * | 6/2013 | Hong ..................... G08C 19/00 |
| | | 340/12.54 |

FOREIGN PATENT DOCUMENTS

| | | |
|---|---|---|
| KR | 10-2010-0024552 | 3/2010 |
| KR | 10-2012-0046059 | 5/2012 |
| KR | 10-2013-0056275 | 5/2013 |

OTHER PUBLICATIONS

CN Office Action dated Mar. 20, 2018 for CN Application No. 201510927305.1—English translation provided.

* cited by examiner 200-4
d12

200-5
d13

200-6
d14

Play 100  d11

DEVICE FOR CONTROLLING SOUND REPRODUCING DEVICE AND METHOD OF CONTROLLING THE DEVICE

CROSS-REFERENCE TO RELATED APPLICATION

This application is based on and claims priority under 35 U.S.C. § 119 to Korean Patent Application No. 10-2014-0180496, filed on Dec. 15, 2014, in the Korean Intellectual Property Office, the disclosure of which is incorporated by reference herein in its entirety.

BACKGROUND

1. Field

The disclosure relates to a device for controlling a sound reproducing device and a method of controlling the device, and for example, to a device for controlling sound output by a sound reproducing device according to a motion of the device and a method of controlling the device.

2. Description of Related Art

As various devices, including mobile devices, provide various and complex functions, the devices may include functions for recognizing gestures of the devices.

Recently, as various functions are embodied based on gestures of a device, research into interface environments and gestures that are more convenient to a user are in demand.

SUMMARY

A device for controlling sound output by a sound reproducing device according to a motion of the device and a method of controlling the device is provided.

Additional aspects will be set forth in part in the detailed description which follows and, in part, will be apparent from the description.

According to an aspect of an example, a device for controlling a sound reproducing device, the device includes a communication unit including communication circuitry configured to transmit and receive data to and from the sound reproducing device; a sensing unit including at least one sensor, which detects a motion of the device and obtains azimuth information regarding an azimuth pointed by a pre-set region of the device based on the motion; and a control unit including a controller configured to receive the azimuth information regarding the sound reproducing device from the sound reproducing device via the communication unit and, if it is determined that the azimuth information regarding the device corresponds to the azimuth information regarding the sound reproducing device within a pre-set range, to determine the sound reproducing device as a controlled device.

If a plurality of azimuth information regarding a plurality of sound reproducing devices are received from the plurality of sound reproducing devices, the control unit is configured to determine at least one sound reproducing device of which azimuth information is determined to correspond to the azimuth information regarding the device within a pre-set range from among the plurality of sound reproducing devices as the controlled device.

If it is determined via the sensing unit that a motion of the device is equal to or greater than a designated range, the control unit is configured to determine whether the azimuth information regarding the device corresponds to the azimuth information regarding the sound reproducing device within a pre-set range.

The control unit is configured to control the sound reproducing device determined as the controlled device via the communication unit to output sounds.

If a motion of the device is detected by the sensing unit within a range in which the azimuth information regarding the device corresponds to the azimuth information regarding the sound reproducing device, the control unit is configured to obtain information regarding a direction of the motion of the device and controls at least one of functions including volume adjustment and change of sound files to be reproduced of the sound reproducing device determined as the controlled device.

If it is determined via the sensing unit that the motion of the device is equal to or greater than a designated range and the azimuth information regarding the device does not correspond to the azimuth information regarding the sound reproducing device determined as the controlled device within the pre-set range, the control unit is configured to stop controlling the sound reproducing device determined as the controlled device.

The control unit is configured to receive the azimuth information regarding a plurality of sound reproducing devices from the plurality of sound reproducing devices and to re-determine a sound reproducing device of which azimuth information is determined to correspond to the azimuth information regarding the device within a pre-set range from among the plurality of sound reproducing devices as the controlled device.

According to an aspect of another example, a sound reproducing device, which receives control signals from an external device, the sound reproducing device includes a communication unit including communication circuitry configured to receive a control signal from the external device; a sensing unit including at least one sensor, which obtains azimuth information regarding an azimuth pointed by a pre-set region of the sound reproducing device; and a control unit including a controller configured to transmit the azimuth information regarding the sound reproducing device to the external device via the communication unit and, as it is determined that the azimuth information regarding the device corresponds to the azimuth information regarding the sound reproducing device within a pre-set range, to receive a control signal related to an operation of the sound reproducing device from the external device via the communication unit.

The control signal related to an operation of the sound reproducing device is a control signal related to at least one of functions including sound output, sound volume adjustment, and change of sound files to be reproduced.

According to an aspect of another example, a device for controlling a sound reproducing device, the device includes a communication unit including communication circuitry configured to transmit and receive data to and from the sound reproducing device; a sensing unit including at least one sensor, which detects a motion of the device and obtains azimuth information regarding an azimuth pointed by a pre-set region of the device based on the motion; and a control unit including a controller configured to receive the azimuth information regarding a plurality of sound reproducing devices from the plurality of sound reproducing device via the communication unit and, in consideration of the azimuth information regarding the device, to set arrangement information regarding each of the plurality of sound reproducing device based on the azimuth information regarding the plurality of sound reproducing devices.

The control unit is configured to control sound outputs of the plurality of sound reproducing devices based on the arrangement information regarding the plurality of sound reproducing devices.

The arrangement information refers to a direction in which the sound reproducing device is arranged in correspondence to the device and includes at least one of left, right, front, and rear.

According to an aspect of another example, a method by which a device controls a sound reproducing device, the method includes receiving azimuth information regarding the sound reproducing device from the sound reproducing device; obtaining azimuth information regarding an azimuth pointed by a pre-set region of the device based on the motion of the device; and, if it is determined that the azimuth information regarding the device corresponds to the azimuth information regarding the sound reproducing device within a pre-set range, determining the sound reproducing device as a controlled device.

In receiving the azimuth information regarding the sound reproducing device, the azimuth information regarding a plurality of sound reproducing devices is received from the plurality of sound reproducing devices, and, in determining the sound reproducing device as the controlled device, a sound reproducing device of which azimuth information is determined to correspond to the azimuth information regarding the device within a pre-set range from among the plurality of sound reproducing devices is determined as the controlled device.

If it is determined via the sensing unit that a motion of the device is equal to or greater than a designated range, it is determined whether the azimuth information regarding the device corresponds to the azimuth information regarding the sound reproducing device within a pre-set range.

The method further includes controlling the sound reproducing device determined as the controlled device via the communication unit to output sounds.

The method further includes detecting a motion of the device within a range in which the azimuth information regarding the device corresponds to the azimuth information regarding the sound reproducing device; obtaining information regarding a direction of the motion of the device; and controlling at least one of functions including volume adjustment and change of sound files to be reproduced of the sound reproducing device determined as the controlled device.

The method further includes, if it is determined via the sensing unit that a motion of the device is equal to or greater than a designated range and the azimuth information regarding the device does not correspond to the azimuth information regarding the sound reproducing device within the pre-set range, stopping controlling the sound reproducing device determined as the controlled device.

The method further includes receiving azimuth information regarding a plurality of sound reproducing devices from the plurality of sound reproducing devices; and re-determining a sound reproducing device of which azimuth information is determined to correspond to the azimuth information regarding the device within a pre-set range from among the plurality of sound reproducing devices as the controlled device.

According to an aspect of another example, a method by which a device controls a sound reproducing device, includes obtaining azimuth information regarding an azimuth pointed by a pre-set region of the device based on the motion of the device; receiving azimuth information regarding a plurality of sound reproducing devices from the plurality of sound reproducing devices; and, in consideration of the azimuth information regarding the device, setting arrangement information regarding each of the plurality of sound reproducing device based on the azimuth information regarding the plurality of sound reproducing devices.

The method further includes controlling sound outputs of the plurality of sound reproducing devices based on the arrangement information regarding the plurality of sound reproducing devices.

In determining the arrangement information regarding each of the plurality of sound reproducing devices, the arrangement information refers to a direction in which the sound reproducing device is arranged in correspondence to the device and includes at least one of left, right, front, and rear.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein.

DETAILED DESCRIPTION

Figure 1:
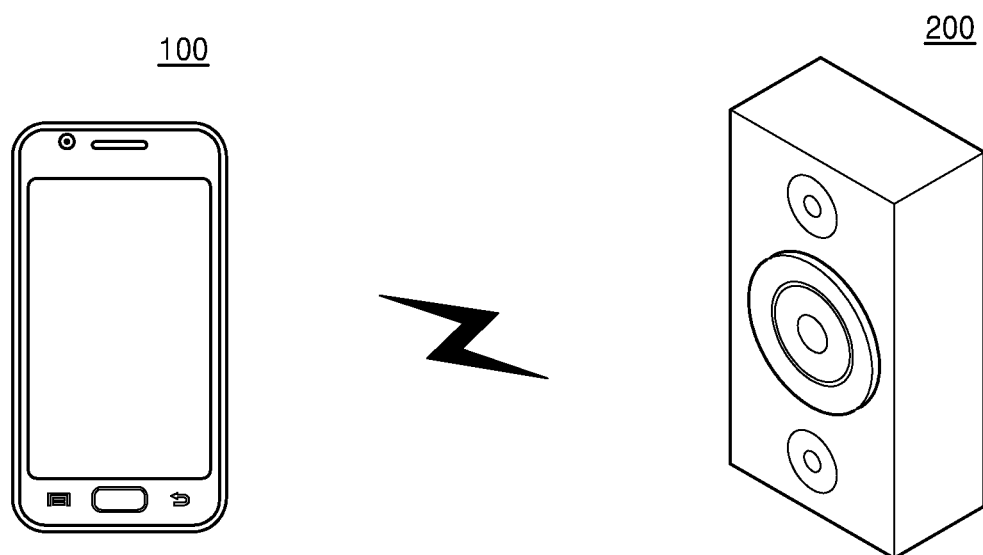
FIG. 1 is a diagram illustrating an example communication between a device and a sound reproducing device.

Hereinafter, examples will be described more fully with reference to the accompanying drawings. These examples may, however, be embodied in many different forms and should not be construed as limited to the examples set forth herein. Rather, the examples are provided so that this disclosure will be thorough and complete, and will convey the scope of the disclosure to those skilled in the art. In drawings, certain elements are omitted for clarity, and like elements denote like reference numerals throughout the specification. As used herein, the term "and/or" includes any and all combinations of one or more of the associated listed items. Expressions such as "at least one of," when preceding a list of elements, modify the entire list of elements and do not necessarily modify the individual elements of the list.

The purpose, features and advantages of the disclosure will be understood through the detailed descriptions given below with reference to the attached drawings. However, as the disclosure allows for various changes and numerous examples, particular examples will be illustrated in the drawings and described in detail. However, this is not intended to limit the disclosure to particular modes of practice, and it is to be appreciated that all changes, equivalents, and substitutes that do not depart from the spirit and technical scope of the disclosure are encompassed in the disclosure. In describing the drawings, like reference numerals are used for like elements. In the following description, the detailed description of known functions and configurations incorporated herein is omitted when it may make the subject matter of the disclosure unclear. Furthermore, numbers used for description of the examples (for example, the first and the second, etc) are merely identification symbols for distinguishing one element from another.

Hereinafter, examples will be described in detail with reference to accompanying drawings. The suffixes 'module' and 'unit' may be used for elements in order to facilitate the disclosure. Significant meanings or roles may not be given to the suffixes themselves and it is understood that the 'module' and 'unit' may be used together or interchangeably. A module or unit may include various circuitry configured to affect the functions of the disclosed modules and units.

The term "portable devices" described below may, for example, include a mobile phone, a smart phone, a tablet PC, a laptop computer, a digital broadcasting terminal, a personal digital assistant (PDA), a portable multimedia player (PMP), and a navigation device. However, it will be apparent to one of ordinary skill in the art that, except cases in which examples are applicable only to mobile terminals, the examples may also be applied to fixed terminals, such as a digital TV and a desktop computer.

Throughout the disclosure, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, examples will be described in detail with reference to accompanying drawings.

FIG. 1 is a diagram illustrating an example communication between a device and a sound reproducing device.

According to an example, a device 100 may control a sound reproducing device 200 to output sound. For example, each of the device 100 and the sound reproducing device 200 may include communication circuitry, such as, for example, a Bluetooth Low Energy (BLE) communication unit and a Wi-Fi (WLAN) communication unit and may transmit and receive designated control signals to and from the other within a designated distance.

According to an example, when azimuth information regarding the device 100 corresponds to information regarding an azimuth at which the sound reproducing device 200 is arranged as the device 100 moves, the device 100 transmits a control signal for controlling the sound reproducing device 200 to output sounds to the sound reproducing device 200 via communication circuitry of a communication unit 150.

For example, while a user of the device 100 is holding the device 100, a sound may be output by the sound reproducing device 200 based on a gesture of the device 100 pointing at the sound reproducing device 200, which is to output sound. Furthermore, as the device 100 moves, various control functions including volume adjustment and change of sound files to be reproduced may be performed.

Therefore, the user of the device 100 may control reproduction of audio or video more conveniently with simple gestures by moving the device 100.

In the disclosure, the sound reproducing device 200 may, for example, be a speaker system, an audio system, a video system, or a combination thereof. However, the disclosure is not limited thereto, and the sound reproducing device 200 may be a device capable of outputting designated sounds.

Figure 2:
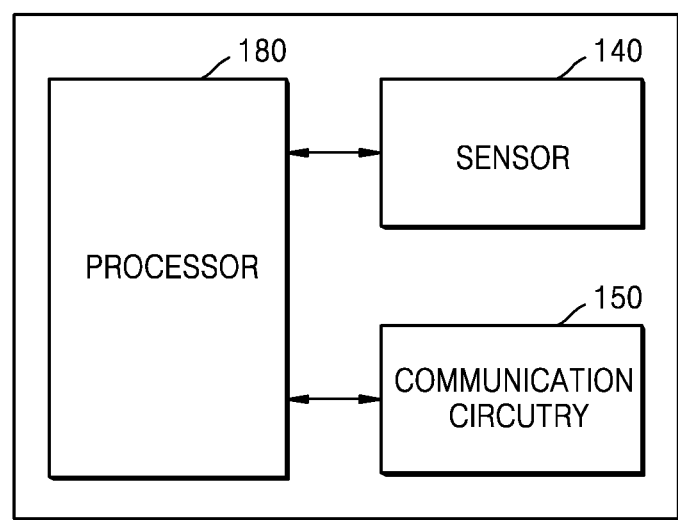
FIGS. 2 and 3 are block diagrams illustrating an example device.
Figure 3:
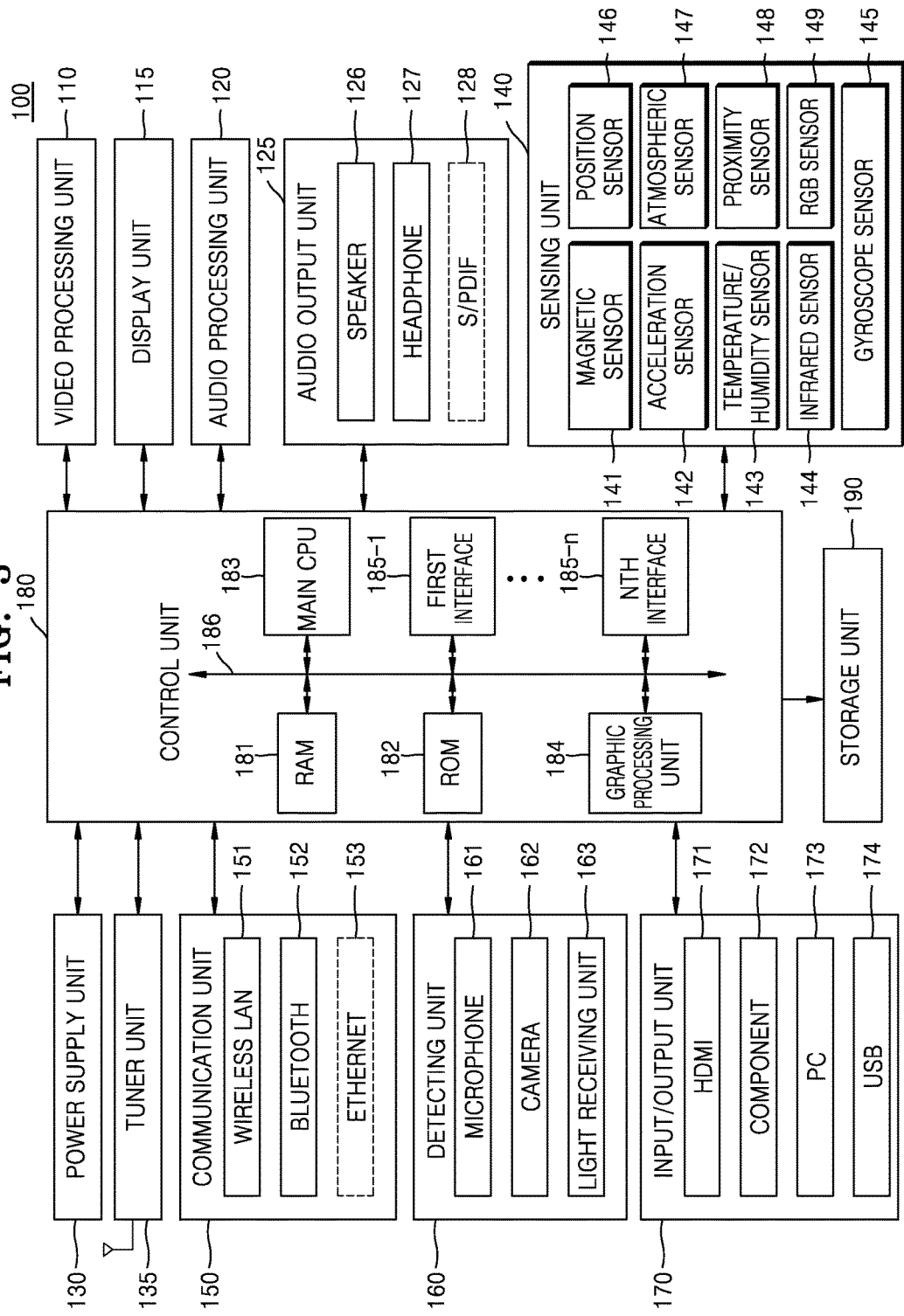

FIGS. 2 and 3 are block diagrams illustrating an example device 100.

Referring to FIG. 2, the device 100 may include a sensing unit 140 including at least one sensor, the communication unit 150 including communication circuitry, and a control unit 180 including a processor or controller. However, not all of the shown components are necessary components. The device 100 may be embodied with more components or less components than the components shown in FIG. 2.

For example, as shown in FIG. 3, the device 100 may, for example, further include a video processing unit 110, an audio processing unit 120, an audio output unit 125, a power supply unit 130, a tuner unit 135, a detecting unit 160, an input/output unit 170, and a storage unit 190.

Hereinafter, detailed descriptions of the above-stated components will be provided.

The video processing unit 110 processes video data received by the device 100. The video processing unit 110 may perform various image processing operations on video data, such as decoding, scaling, noise filtering, frame rate conversion, and resolution conversion.

A display unit 115 may include a display that displays videos included in broadcast signals received via the tuner unit 135 under the control of the control unit 180. Furthermore, the display unit 115 may display content (e.g., moving pictures) input via the communication unit 150 or the input/output unit 170. The input/output unit 170 may output images stored in the storage unit 190 under the control of the control unit 180. Furthermore, the display unit 115 may display a voice user interface (UI) (e.g., a voice UI including a voice command guide) for performing a voice recognition task corresponding to voice recognition or a motion UI (e.g., a motion UI including a user motion guide for motion recognition) for performing a motion recognition task corresponding to motion recognition.

The audio processing unit 120 includes circuitry that processes audio data. The audio processing unit 120 may perform various audio processing operations on audio data, such as decoding, amplification, and noise filtering.

Meanwhile, the audio processing unit 120 may include a plurality of audio processing modules for processing pieces of audio respectively corresponding to contents.

The audio output unit 125 outputs audio included in broadcast signals received via the tuner unit 135 under the control of the control unit 180. The audio output unit 125 may output audio (e.g., sounds, voices, etc.) input via the communication unit 150 or the input/output unit 170. Furthermore, the audio output unit 125 may output audio stored in the storage unit 190 under the control of the control unit 180. The audio output unit 125 may include at least one of a speaker 126, a headphone output terminal 127, and a Sony/Philips digital interface (S/PDIF) output terminal 128. The audio output unit 125 may include a combination of the speaker 126, the headphone output terminal 127, and the S/PDIF output terminal 128.

The power supply unit 130 supplies power input from an external power source to internal components 110 through 190 of the device 100 under the control of the control unit 180. Furthermore, the power supply unit 130 may supply power output by one, two, or more batteries (not shown) arranged inside the device 100 to the internal components 110 through 190 under the control of the control unit 180.

The tuner unit 135 may tune and select a frequency of a channel to be received by the device 100 only from among a number of frequencies by amplifying, mixing, and resonating broadcast signals received via a wire or wirelessly. A broadcast signal includes an audio signal, a video signal, and additional information (e.g., an electronic program guide (EPG)).

The tuner unit 135 may receive broadcast signals in a frequency band corresponding to a channel number (e.g., a cable broadcasting channel 506) based on a user input (e.g., a control signal received from a control device, such as a channel number input, a channel up or down input, and a channel input in an EPG screen image).

The tuner unit 135 may receive broadcast signals from various sources, such as terrestrial wave broadcasting, cable broadcasting, satellite broadcasting, and Internet broadcasting. The tuner unit 135 may also receive broadcast signals from sources including analog broadcasting and digital broadcasting. A broadcast signal received via the tuner unit 135 is decoded (e.g., audio decoding, video decoding, or additional information decoding) and is separated into audio, video, and/or additional information. The separated video, audio, and/or additional information may be stored in the storage unit 190 under the control of the control unit 180.

Furthermore, the device 100 may include one tuner unit 135 or a plurality of tuner units 135. The tuner unit 135 may be included in the device 100, may be embodied as a separate device (e.g., a set-top box (not shown)) having a tuner unit electrically connected to the device 100, or may be embodied as a tuner unit (not shown) that may be connected to the input/output unit 170.

The tuner unit 135 according to an example may receive broadcast signals and output the broadcast signals to the display unit 115 under the control of the control unit 180.

The sensing unit 140 includes at least one sensor and may detect a state of the device 100 or states of the surroundings of the device 100 and transmit detection information to the power supply unit 130. The sensing unit 140 may include at least one of a geomagnetic sensor 141, an acceleration sensor 142, a temperature/humidity sensor 143, an infrared sensor 144, a gyroscope sensor 145, a location sensor (e.g., a GPS sensor) 146, an atmospheric pressure sensor 147, a proximity sensor 148, and an illuminance (e.g., RGB) sensor 149, but is not limited thereto. Since functions of the above-stated sensors are apparent to one of ordinary skill in the art based on names of the above-stated sensors, detailed descriptions thereof will be omitted.

Furthermore, the sensing unit 140 may include a sensor for detecting a touch input from an input device and a sensor for detecting a touch input from a user. For example, the sensor for detecting a touch input from a user may be included in a touch screen or a touch pad. Furthermore, the sensor for detecting a touch input from an input device may be located below a touch screen or a touch pad or may be included in a touch screen or a touch pad.

According to an example, the sensing unit 140, including the acceleration sensor 142, may sense a motion of the device 100. Furthermore, the sensing unit 140 may determine whether the motion of the device 100 is within a designated degree.

Furthermore, according to an example, the sensing unit 140, including the geomagnetic sensor 141, may obtain information regarding an azimuth pointed by a pre-set region of the device 100 according to a motion of the device 100.

Furthermore, the sensing unit 140 may determine whether a motion of the device 100 is detected within a range in which azimuth information regarding the device 100 corresponds to azimuth information regarding the sound reproducing device 200.

Furthermore, the sensing unit 140 may obtain information regarding a direction of a motion of the device 100.

The communication unit 150 may be configured to connect the display device 100 to an external device (e.g., an audio device) under the control of the control unit 180. The control unit 180 may be configured to transmit/receive content to/from, download applications from, or browse web sites via an external device connected to the display device via the communication unit 150.

The communication unit 150 includes communication circuitry that may include at least one of a wireless LAN communication unit 151, a Bluetooth communication unit 152, and a wired Ethernet communication unit 153 corresponding to the performance and structure of the display device 100. The communication unit 150 may also include a combination of the wireless LAN communication unit 151, the Bluetooth communication unit 152, and the Ethernet communication unit 153.

Furthermore, the communication unit 150 may include a Bluetooth Low Energy communication unit, a near field communication (NFC) unit, a Wi-Fi (WLAN) communication unit, a ZigBee communication unit, an infrared data association (IrDA) communication unit, a Wi-Fi Direct (WFD) communication unit, an ultra wideband (UWB) communication unit, an Ant+ communication unit, etc. However, the disclosure is not limited thereto.

Furthermore, the communication unit 150 may be configured to transmit and receive wireless signals to and from at least one of a station, an external device, and a server on a mobile communication network. Here, the wireless signals may include voice call signals, video call signals, or various types of data related to transmission and reception of text/multimedia messages.

Furthermore, the communication unit 150 may include a broadcast receiving unit that receives broadcast signals and/or broadcast-related information from outside via broadcasting channels. The broadcasting channels may include satellite channels and terrestrial wave channels.

Furthermore, the communication unit 150 may receive control signals from an external control device under the control of the control unit 180. The control signals may be Bluetooth type signals, RF type signals, or Wi-Fi type signals.

The communication unit 150 according to an example may communicate with an external audio device under the control of the control unit 180. Particularly, the communication unit 150 may include a BLE communication unit and a WLAN communication unit and may transmit and receive designated control signals to and from an external audio device within a designated distance.

According to an example, the communication unit 150 may receive azimuth information regarding the sound reproducing device 200 from the sound reproducing device 200.

According to an example, the communication unit 150 may transmit a control signal for controlling the sound reproducing device 200 to output designated sounds to the sound reproducing device 200.

The detecting unit 160 detects a voice of a user, an image of the user, or an interaction of the user.

The microphone 161 receives an uttered voice of a user. The microphone 161 may, for example, transform a received voice into an electric signal and output the electric signal to the control unit 180. A voice of a user may include a voice command corresponding to a menu or a function of the display device 100. A recommended recognition range of the microphone 161 may, for example, be within 4m from the microphone 161 to a location of a user. However, the recognition range of the microphone 161 may vary depending on the level of a voice of a user and surrounding environments (e.g., the level of a sound from a speaker, the levels of ambient noises, etc.)

The microphone 161 may, for example, be included in the display device 100 or may be embodied separately from the display device 100. The separated microphone 161 may be electrically connected to the display device 100 via the communication unit 150 or the input/output unit 170.

It will be apparent to one of ordinary skill in the art that the microphone 161 may be omitted depending on the performance and structures of the display device 100.

The camera 162 may include a lens (not shown) and an image sensor (not shown). The camera 162 may, for example, provide an optical zoom or a digital zoom by using a plurality of lenses and image processing techniques. A recognition range of the camera 162 may be set to any of various values based on an angle of the camera 162 and surrounding environmental conditions. If the camera 162 includes a plurality of cameras, a 3-dimensional (3D) still image or a 3D motion may be received via the plurality of cameras.

The camera 162 may be included in the display device 100 or may be embodied separately from the display device 100. The separated camera 162 may be electrically connected to the display device 100 via the communication unit 150 or the input/output unit 170.

It will be apparent to one of ordinary skill in the art that the camera 162 may be omitted depending on the performance and structures of the display device 100.

The light receiving unit 163 receives optical signals (including control signals) received from an external control device via an optical window (not shown) of, for example, the bezel of the display unit 115. The light receiving unit 163 may receive an optical signal corresponding to a user input (e.g., a touch, a press, a touch gesture, a voice, or a motion) from an external control device. A control signal may be extracted from the received optical signal under the control of the control unit 180.

The input/output unit 170 receives video (e.g., moving pictures), audio (e.g., voices, music, etc.), and additional information from outside of the display device 100 under the control of the control unit 180. The input/output unit 170 may include one of a high-definition multimedia interface (HDMI) port 171, a component jack 172, a PC port 173, and a USB port 174. The input/output unit 170 may include a combination of the HDMI port 171, the component jack 172, the PC port 173, and the USB port 174.

It will be apparent to one of ordinary skill in the art that configurations and operations of the input/output unit 170 may vary depending on examples.

The control unit 180 is configured to control the overall operations of the display device 100, to control signal flows between the internal components 110 through 190 of the display device 100, and to process data. If there is a user input or a condition, which is set and stored in advance, is satisfied, the control unit 180 may execute operation System (OS) and various applications stored in the storage unit 190.

The control unit 180 may include RAM 181, which stores signals or data input from outside of the display device 100 or may be used as a storage space corresponding to various tasks performed by the display device 100, ROM 182, which stores a control program for controlling the display device 100, and a processor 183.

The processor 183 may include a graphics processing unit (GPU) (not shown) for processing graphics corresponding to video. The processor 183 may be embodied as a system-on-chip (SoC) in which a core (not shown) and a GPU (not shown) are integrated with each other. The processor 183 may include a single core (1 core), two cores (2 cores), three cores (3 cores), four cores (4 cores), or multiple cores.

Furthermore, the processor 183 may include a plurality of processors. For example, the processor 183 may include a main processor (not shown) and a sub processor (not shown) that operates in a sleep mode.

The graphics processing unit 184 generates a screen image including various objects, such as icons, images, and text, by using a calculating unit (not shown) and a rendering unit (not shown). The calculating unit calculates property values, such as coordinates, shapes, sizes, and colors, for displaying respective objects based on layouts of screen images by using user interactions detected by the detecting unit 160. The rendering unit generates screen images of various layouts including objects based on property values calculated by the calculating unit. A screen image generated by the rendering unit is displayed on a display area of the display unit 115.

First through nth interfaces 185-1 through 185-n are connected to the above-stated components. One of the interfaces may be a network interface connected to an external device via a network.

The RAM 181, the ROM 182, the processor 183, the graphics processing unit 184, and the first through nth interfaces 185-1 through 185-n may be connected to one another via an internal bus 186.

In the example, the term "control unit" may include the processor 183, the ROM 182, and the RAM 181.

The control unit 180 of the device 100 according to an example may receive azimuth information regarding the sound reproducing device 200 from the sound reproducing device 200 via the communication unit 150.

Furthermore, if it is determined that the azimuth information regarding the device 100 corresponds to the azimuth information regarding the sound reproducing device 200 within a pre-set range, the control unit 180 of the device 100 may be configured to determine the sound reproducing device 200 as a controlled device.

Furthermore, if azimuth information regarding a plurality of sound reproducing devices 200 is received from the plurality of sound reproducing devices 200, the control unit 180 may be configured to determine at least one sound reproducing device 200, of which azimuth information is determined to correspond to azimuth information regarding the device 100 within a pre-set range, from among the plurality of sound reproducing devices 200 as a controlled device.

Furthermore, if it is determined via the sensing unit 140 that a degree of a motion of the device 100 is equal to or greater than a designated range, the control unit 180 may be configured to determine whether azimuth information regarding the device 100 corresponds to azimuth information regarding the sound reproducing device 200 within a pre-set range.

Furthermore, the control unit 180 may be configured to control the sound reproducing device 200, which is determined as the controlled device, to output sounds via the communication unit 150.

Furthermore, if a motion of the device 100 is detected via the sensing unit 140 within a range in which azimuth information regarding the device 100 corresponds to azimuth information regarding the sound reproducing device 200, the control unit 180 may be configured to obtain information regarding a direction of the motion of the device 100 and control functions of the sound reproducing device 200 determined as the controlled device, such as volume adjustment and change of sound files to be reproduced.

Furthermore, if it is determined via the sensing unit 140 that a motion of the device 100 is equal to or greater than a designated range and azimuth information regarding the device 100 does not correspond to the information regarding an azimuth at which the sound reproducing device 200 that is determined as the controlled device within the pre-set range, the control unit 180 may be configured to stop controlling the sound reproducing device 200 that is determined as the controlled device.

Furthermore, the control unit 180 may be configured to receive information regarding azimuths at which a plurality of sound reproducing devices 200 are arranged from the plurality of sound reproducing devices 200 and may re-determine the sound reproducing device 200 of which azimuth information is determined to correspond to azimuth information regarding the device 100 within a pre-set range, from among the plurality of sound reproducing devices 200 as a controlled device.

Furthermore, the control unit 180 may be configured to receive information regarding azimuths at which a plurality of sound reproducing devices 200 are arranged from the plurality of sound reproducing devices 200 and to determine respective arrangement information regarding the plurality of sound reproducing devices 200 based on the azimuth information regarding the device 100.

Furthermore, the control unit 180 may be configured to control respective sound output power of the plurality of sound reproducing devices 200 based on the information regarding the arrangements of the plurality of sound reproducing devices 200.

It will be apparent to one of ordinary skill in the art that configurations and operations of the control unit 180 may vary depending on examples.

The storage unit 190 may store various data, programs, or applications for operating and controlling the device 100 under the control of the control unit 180. The storage unit 190 may store signals or pieces of data that are input/output corresponding to operations of the video processing unit 110, the display unit 115, the audio processing unit 120, the audio output unit 125, the power supply unit 130, the sensing unit 140, the communication unit 150, the detecting unit 160, and the input/output unit 170. The storage unit 190 may store control programs for controlling the device 100 and the control unit 180, applications that are initially provided by a manufacturer or downloaded from outside, graphical user interfaces (GUI) related to the applications, objects for providing GUIs (e.g., images, text, icons, buttons, etc.), user information, documents, databases, or related data.

According to an example, the term "storage unit" includes the storage unit 190, the ROM 182 and the RAM 181 of the control unit 180, or a memory card (e.g., a micro SD card, a USB memory, etc.) (not shown) connected to the device 100. Furthermore, the storage unit 190 may include a non-volatile memory, a volatile memory, a hard disk drive (HDD), or a solid state drive (SSD).

The storage unit 190 may include a broadcast receiving module, a channel control module, a volume control module, a voice recognition module, a motion recognition module, a light receiving module, a display control module, an audio control module, an external input control module, a power control module, a module for controlling power of a wirelessly connected external device, a voice database (DB), or a motion database (DB) (not shown). The modules and databases of the storage unit 190 that are not shown may be embodied in the form of software for performing a broadcast reception control function, a channel control function, a volume control function, a communication control function, a voice recognition function, a motion recognition control function, a light reception control function, a display control function, an audio control function, an external input control function, a power control function, or a function for controlling power of a wirelessly connected external device. The control unit 180 may perform respective functions by using the above-stated software stored in the storage unit 190.

Furthermore, the device 100 including the display unit 115 may be electrically connected to a separate external device (e.g., a set-top box) (not shown) including a tuner unit. For example, the device 100 may be embodied as an analog TV, a digital TV, a 3D TV, a smart TV, a LED TV, an OLED TV, a plasma TV, a monitor, etc. However, it will be apparent to one of ordinary skill in the art that the disclosure is not limited thereto.

At least one component may be added to the device 100 shown in FIG. 3 or at least one of the components (e.g., the internal components 110 through 190) of the device 100 may be omitted, depending on the performance of the device 100. Furthermore, it will be apparent to one of ordinary skill in the art that locations of components (e.g., the internal components 110 through 190) may vary according to performances or structures of the device 100.

Figure 4:
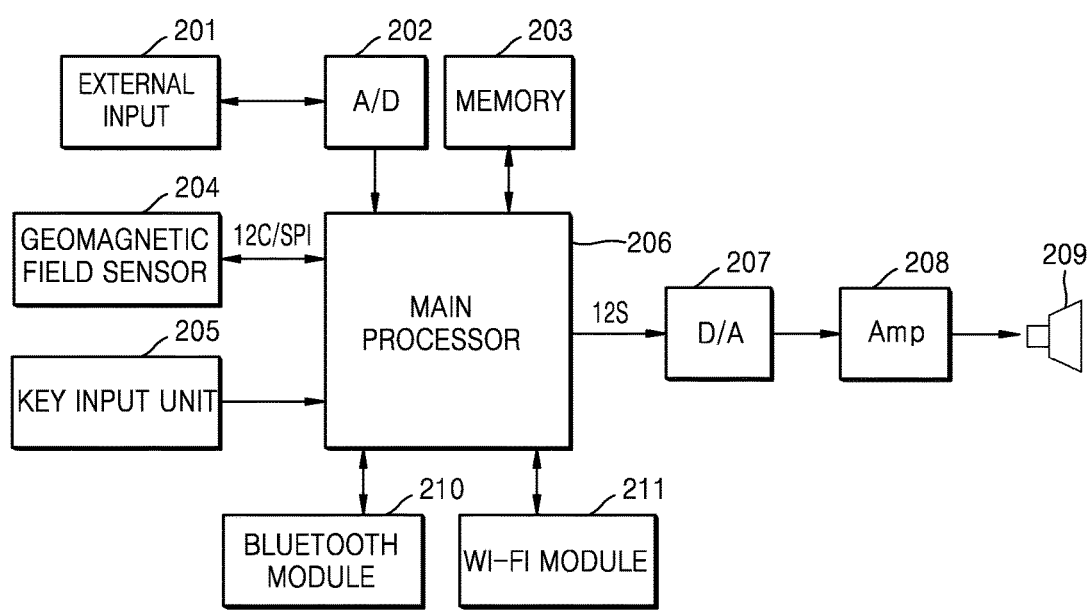
FIG. 4 is a block diagram illustrating an example sound reproducing device.

FIG. 4 is a block diagram illustrating an example sound reproducing device 200.

According to an example, the sound reproducing device 200 may include a control unit, a communication unit, and a sensing unit. However, not all of the shown components are necessary components. The sound reproducing device 200 may be embodied with more components or less components than the components shown, for example, in FIG. 4.

The control unit of the sound reproducing device 200 may refer to a main processor 206 shown in FIG. 4. Furthermore, the communication unit of the sound reproducing device 200 may include various communication circuitry, including a Bluetooth module 210 and a Wi-Fi module 211 shown in FIG. 4. Furthermore, the sensing unit of the sound reproducing device 200 may include various sensors, including, for example, a geomagnetic field sensor 204 shown in FIG. 4.

Referring to FIG. 4, the sound reproducing device 200 may include an external input 201, an A/D converter 202, a memory 203, the geomagnetic field sensor 204, a key input unit 205, the main processor 206, a D/A converter 207, an amplifier 208, a speaker 209, the Bluetooth module 210, and the Wi-Fi module 211.

The external input 201 receives video (e.g., moving pictures), audio (e.g., voices, music, etc.), and additional information (e.g., an EPG) from outside of the sound reproducing device 200 under the control of the main processor 206.

The A/D converter 202 may convert analog signals into digital signals. The memory 203 may store data and programs related to controlling of the sound reproducing device 200.

The geomagnetic field sensor 204 may sense an azimuth at which the sound reproducing device 200 is arranged and transmit information regarding the azimuth to the main processor 206. According to an example, the sensing unit including the geomagnetic field sensor 204 may obtain azimuth information regarding the sound reproducing device 200.

The key input unit 205 may receive inputs related to operations of the sound reproducing device 200 from, for example, a user.

The main processor 206 is configured to control the overall operations of the sound reproducing device 200, to control signal flows between internal components 201 through 211 of the sound reproducing device 200, and to process data. The main processor 206 may decode digital input signals into analog signals.

According to an example, as it is determined that information regarding an azimuth pointed by an external device corresponds to azimuth information regarding the sound reproducing device 200 within a pre-set range, the control unit including the main processor 206 may be configured to receive a control signal related to an operation of the sound reproducing device 200 from the external device via the communication unit.

According to an example, the communication unit including the Bluetooth module 210 or the Wi-Fi module 211 may transmit azimuth information regarding the sound reproducing device 200 to the external device 100.

Furthermore, the communication unit 150 including the Bluetooth module 210 and the Wi-Fi module 211 may receive a control signal related to sound output by the sound reproducing device 200 from the external device 100.

The D/A converter 207 may convert digital signals from the main processor 206 into analog signals. The amplifier 208 may amplify analog signals output by the D/A converter 207. The speaker 209 may output analog signals input from the amplifier 208 as actual sounds.

Figure 5:
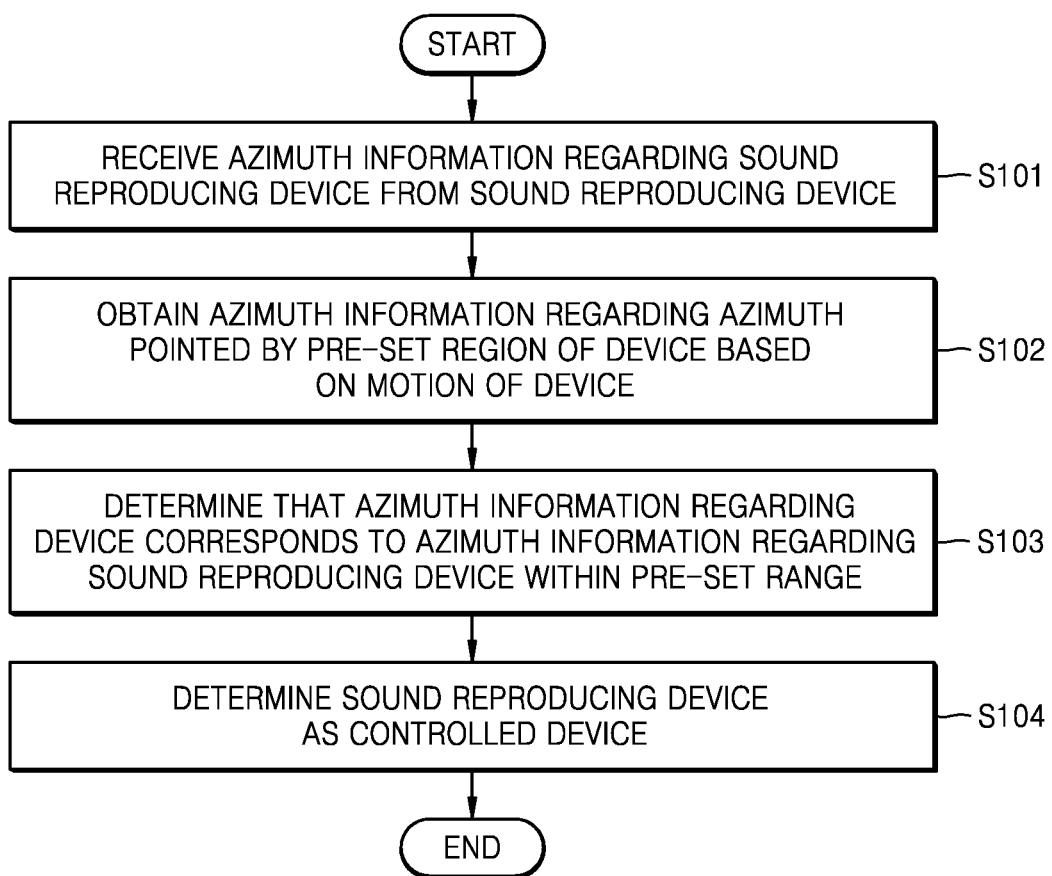
FIG. 5 is a flowchart illustrating an example method of controlling a device for controlling a sound reproducing device.
Figure 6:
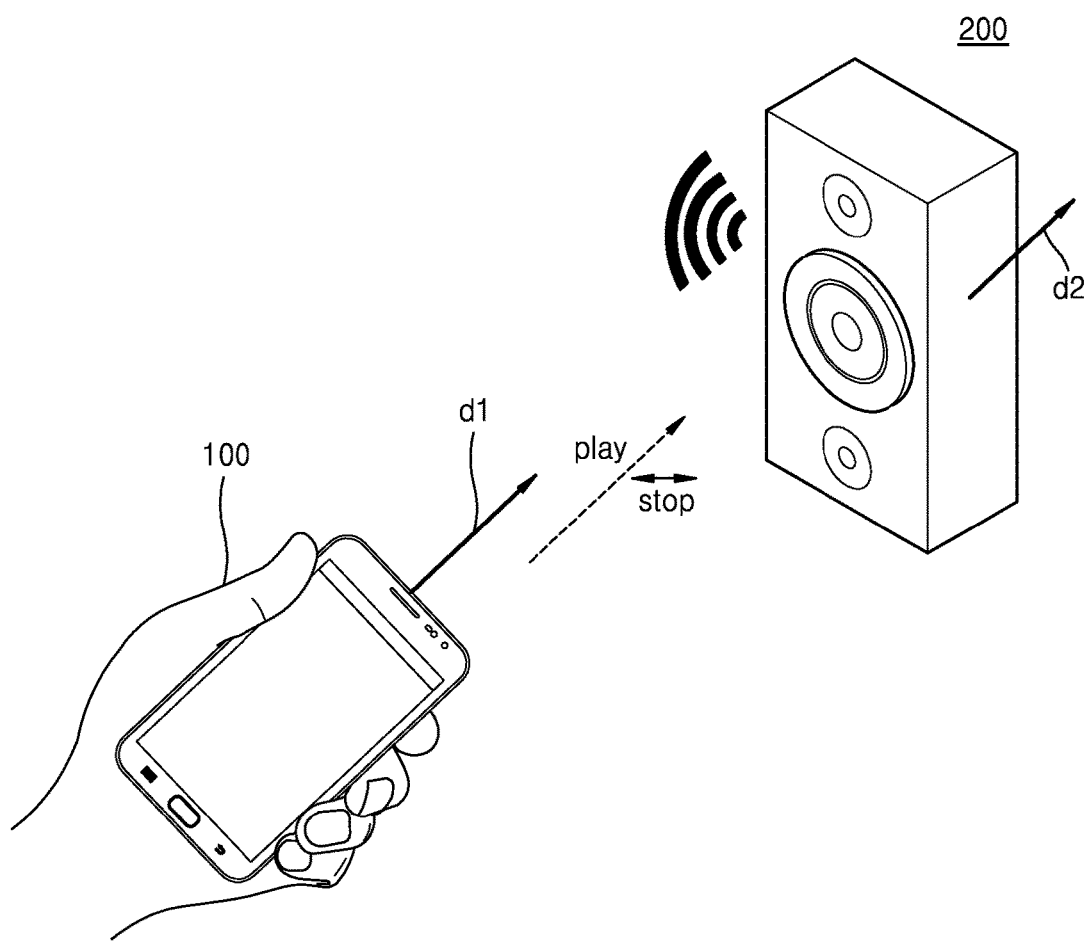
FIG. 6 is a diagram illustrating an example of devices for controlling a sound reproducing device and illustrating an example of devices for controlling a sound reproducing device.

FIG. 5 is a flowchart illustrating an example method of controlling a device for controlling a sound reproducing device. FIG. 6 is a diagram illustrating an example of devices for controlling a sound reproducing device.

In operation S101 of FIG. 5, the control unit 180 of the device 100 may be configured to receive azimuth information regarding the sound reproducing device 200 from the sound reproducing device 200 via the communication unit 150.

According to an example, azimuth information may refer to coordinates of an object on a plane. According to an example, the sound reproducing device 200 is arranged to point to a designated azimuth, and the sound reproducing device 200 may obtain azimuth information via the geomagnetic field sensor 204 included in the sound reproducing device 200.

The sound reproducing device 200 may transmit information regarding an azimuth at which the sound reproducing device 200 is arranged to the device 100 via the Bluetooth module 210 and the Wi-Fi module 211. For example, referring to FIG. 6, the sound reproducing device 200 may be arranged at an azimuth (d2) and may transmit azimuth information corresponding to the azimuth (d2) to the device 100.

In operation S102 of FIG. 5, the control unit 180 of the device 100 may be configured to obtain information regarding an azimuth pointed by a pre-set region of the device 100 based on a motion of the device 100.

According to an example, the control unit 180 of the device 100 may be configured to obtain information regarding a motion of the device 100 including a direction, a speed, and an angle of the motion of the device 100 via the sensing unit 140, including, for example, the acceleration sensor 142.

According to an example, if it is determined that a motion of the device 100 is equal to or greater than a designated range (e.g., a pre-set critical value), the control unit 180 may be configured to obtain information regarding an azimuth pointed by the device 100 via the geomagnetic sensor 141. For example, referring to FIG. 6, the device 100 may be moved to point at the azimuth (d1), and thus the device 100 may obtain corresponding azimuth information.

In operation S103 of FIG. 5, the control unit 180 of the device 100 may be configured to determine that azimuth information regarding the device 100 corresponds to the azimuth information regarding the sound reproducing device 200 within a pre-set range.

According to an example, the control unit 180 of the device 100 may determine that the obtained azimuth information regarding the device 100 corresponds to the azimuth information regarding the sound reproducing device 200 within a pre-set range. For example, the control unit 180 may be configured to determine whether the azimuth information regarding the device 100 is identical to the azimuth information regarding the sound reproducing device 200 or corresponds to the azimuth information regarding the sound reproducing device 200 within a pre-set error range.

In operation S104 of FIG. 5, the control unit 180 of the device 100 may be configured to determine the sound reproducing device 200 as a controlled device.

According to an example, if it is determined that azimuth information regarding the device 100 corresponds to the azimuth information regarding the sound reproducing device 200 within a pre-set range, the control unit 180 of the device 100 may be configured to determine the sound reproducing device 200 as a controlled device.

In the disclosure, a controlled device may, for example, refer to a device that is controlled based on control signals from the device 100. According to an example, a controlled device may be a single sound reproducing device or a plurality of sound reproducing devices. A controlled device may be selected or switched under the control of the device 100.

According to an example, referring to FIG. 6, if it is determined that the azimuth information regarding the device 100 corresponds to azimuth information regarding the sound reproducing device 200, the device 100 may determine the sound reproducing device 200 as a controlled device and transmit a control signal to output sounds to the sound reproducing device 200. For example, the device 100 may control the sound reproducing device 200 to output sounds corresponding to a music file that has been most recently reproduced by the sound reproducing device 200. Furthermore, if the device 100 detects a motion of the device 100 again and it is determined that azimuth information regarding the device 100 corresponds to azimuth information regarding the sound reproducing device 200, the device 100 may control the sound reproducing device 200 to stop outputting sounds. According to an example, the device 100 may repeatedly control the sound reproducing device 200 to output and stop reproduction of a sound file based on a same gesture performed of the device 100.

Figure 7:
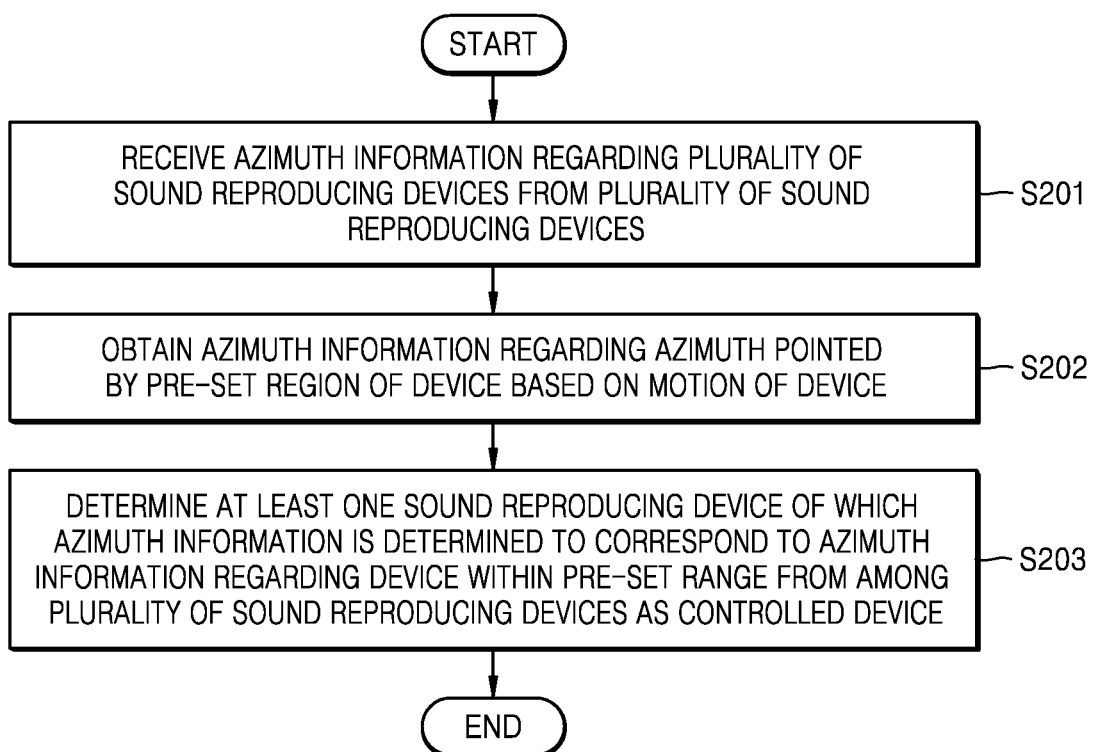
FIG. 7 is a flowchart illustrating an example method of controlling a device for controlling a plurality of sound reproducing devices.
Figure 8A:
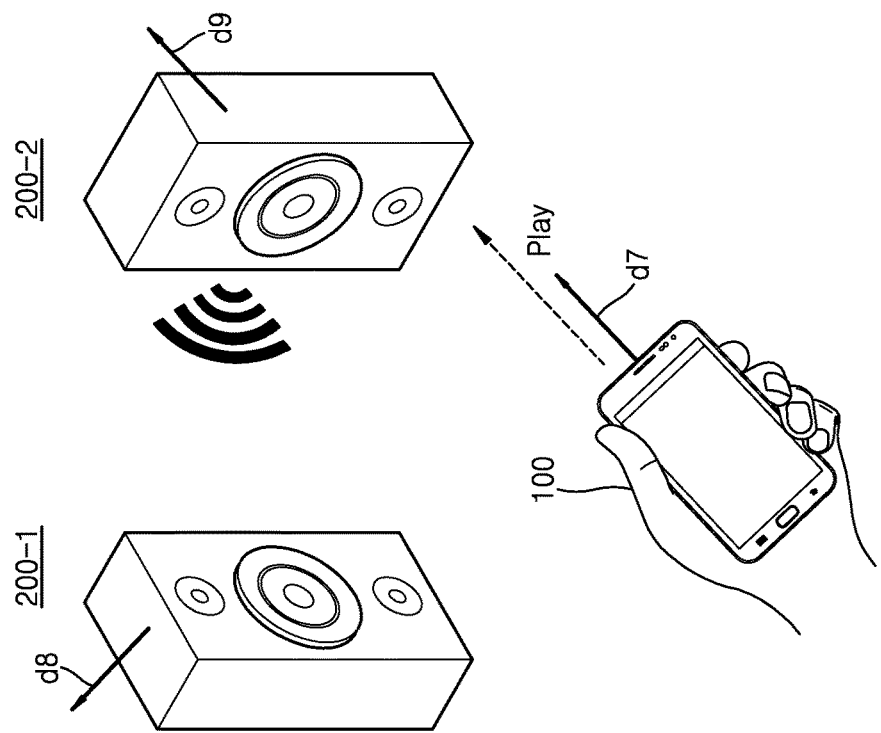
FIGS. 8A, 8B and 9 are diagrams illustrating examples of a device for controlling a plurality of sound reproducing devices.
Figure 8B:
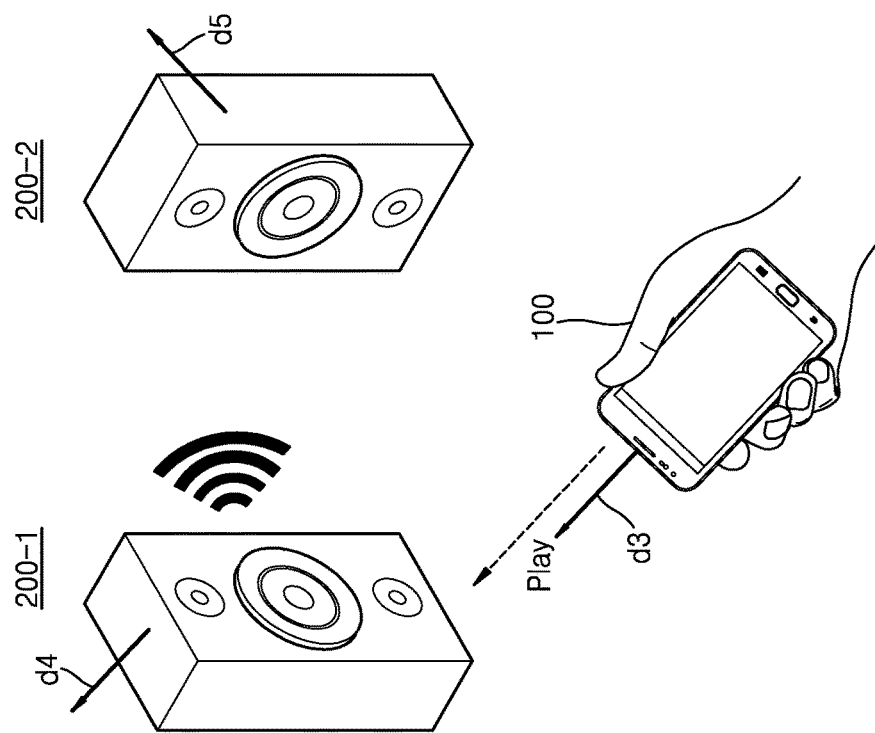
Figure 9:
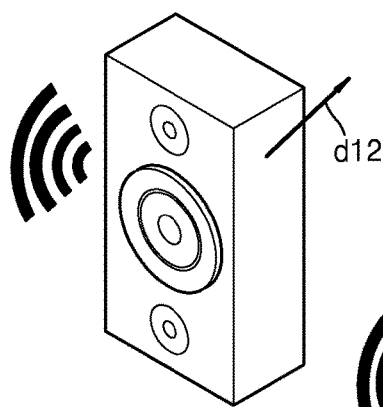
Figure 9:
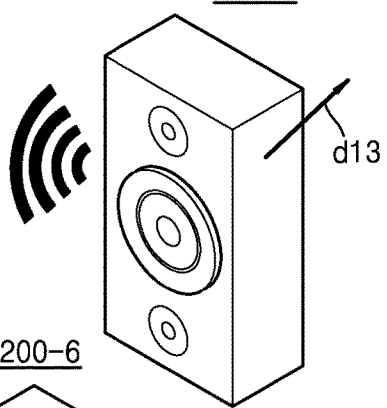
Figure 9:
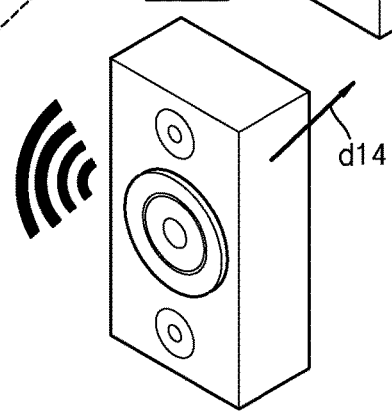
Figure 9:
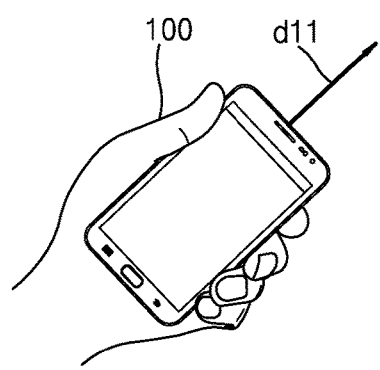

FIG. 7 is a flowchart illustrating an example method of controlling a device for controlling a plurality of sound reproducing devices. FIGS. 8A, 8B and 9 are diagrams illustrating examples of a device for controlling a plurality of sound reproducing devices.

In operation S201 of FIG. 7, the control unit 180 of the device 100 may be configured to receive azimuth information regarding a plurality of sound reproducing devices from the plurality of sound reproducing devices via the communication unit 150.

For example, the device 100 may receive azimuth information regarding a plurality of sound reproducing devices 200 from the plurality of sound reproducing devices 200 located within a designated communicable distance via a Bluetooth Low Energy (BLE) communication unit and a Wi-Fi (WLAN) communication unit. For example, referring to FIGS. 8A and 8B, the device 100 may communicate with a plurality of sound reproducing devices 200-1 and 200-2.

In operation S202 of FIG. 7, the control unit 180 of the device 100 may be configured to obtain information regarding an azimuth pointed to by a pre-set region of the device 100 based on a motion of the device 100.

For example, referring to FIG. 8A, the device 100 may obtain azimuth information corresponding to an azimuth (d3) pointed by the upper end portion of the device 100 based on a motion of the device 100. Furthermore, referring to FIG. 8B, the device 100 may obtain azimuth information corresponding to an azimuth (d7) pointed by the upper end portion of the device 100 according to a motion of the device 100.

In operation S203 of FIG. 7, the control unit 180 of the device 100 may be configured to determine at least one sound reproducing device of which azimuth information is determined to correspond to the azimuth information regarding the device 100 within a pre-set range as a controlled device from among the plurality of sound reproducing devices.

For example, referring to FIG. 8A, since azimuth information regarding the device 100 corresponds to azimuth information regarding an azimuth (d4) pointed by the first sound reproducing device 200-1, the first sound reproducing device 200-1 may be determined as a controlled device and may be controlled to output sounds.

Furthermore, referring to (FIG. 8B, since azimuth information regarding the device 100 corresponds to azimuth information regarding an azimuth (d9) pointed by the second sound reproducing device 200-2, the second sound reproducing device 200-2 may be determined as a controlled device and may be controlled to output sounds.

Furthermore, according to an example, referring to FIG. 9, a plurality of sound reproducing devices 200-4, 200-5, and 200-6 may be arranged to point at azimuths (d12), (d13), and (d14), respectively, and have the same azimuth information. When a device 100 obtains a gesture for pointing the azimuth (d11), it may be determined that the azimuth information regarding the device 100 corresponds to azimuth information regarding the sound reproducing devices 200-4, 200-5, and 200-6. The device 100 may determine the plurality of sound reproducing devices 200-4, 200-5, and 200-6 as controlled devices and control sound outputs thereof.

Figure 10:
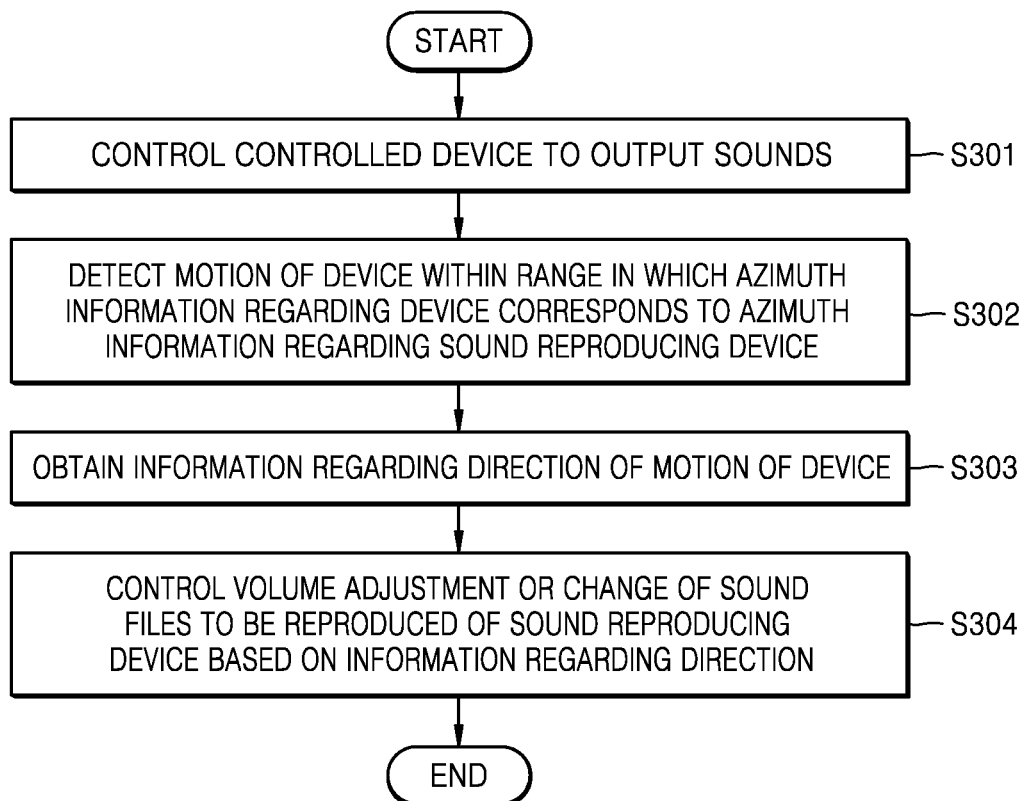
FIG. 10 is a flowchart illustrating an example of controlling a sound reproducing device based on azimuth information regarding a device.

FIG. 10 is a flowchart illustrating an example of controlling a sound reproducing device based on azimuth information regarding a device. FIGS. 11A, 11B, 12A and 12B are diagrams illustrating examples of controlling a sound reproducing device based on azimuth information regarding a device.

In operation S301 of FIG. 10, the control unit 180 of the device 100 may be configured to control a controlled device to output sounds.

According to an example, the device 100 may determine at least one sound reproducing device as a controlled device according to the flowchart shown, for example, in FIG. 5 or 7 and control sound output by the at least one sound reproducing device determined as the controlled device.

In operation S302 of FIG. 10, the control unit 180 of the device 100 may be configured to detect a motion of the device 100 within a range in which azimuth information regarding the device 100 corresponds to azimuth information regarding a sound reproducing device.

Figures 11A, 11B:
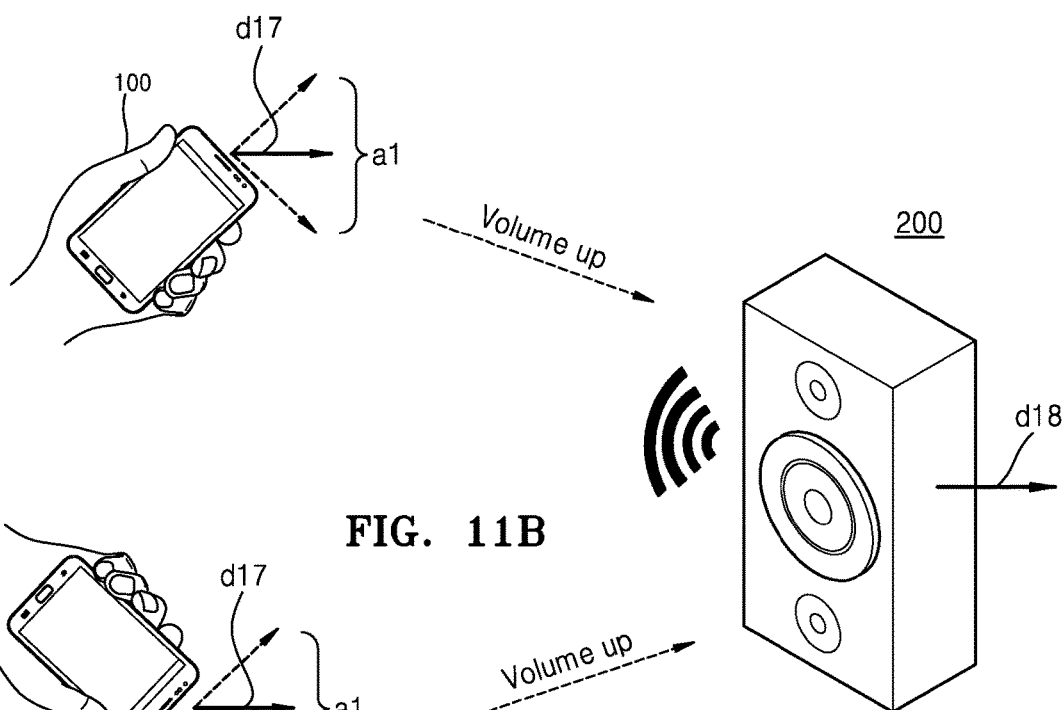
FIGS. 11A, 11B, 12A and 12B are diagrams illustrating examples of controlling a sound reproducing device based on azimuth information regarding a device.

For example, referring to FIGS. 11A and 11B, if the device 100 is arranged to point at an azimuth (d17) and the sound reproducing device 200 is arranged to point an azimuth (d18), the device 100 and the sound reproducing device 200 may have azimuth information corresponding to each other. Here, a motion of the device 100 may be detected within a range a1 in which azimuth information regarding the device 100 corresponds to azimuth information regarding the sound reproducing device 200.

Figures 12A, 12B:
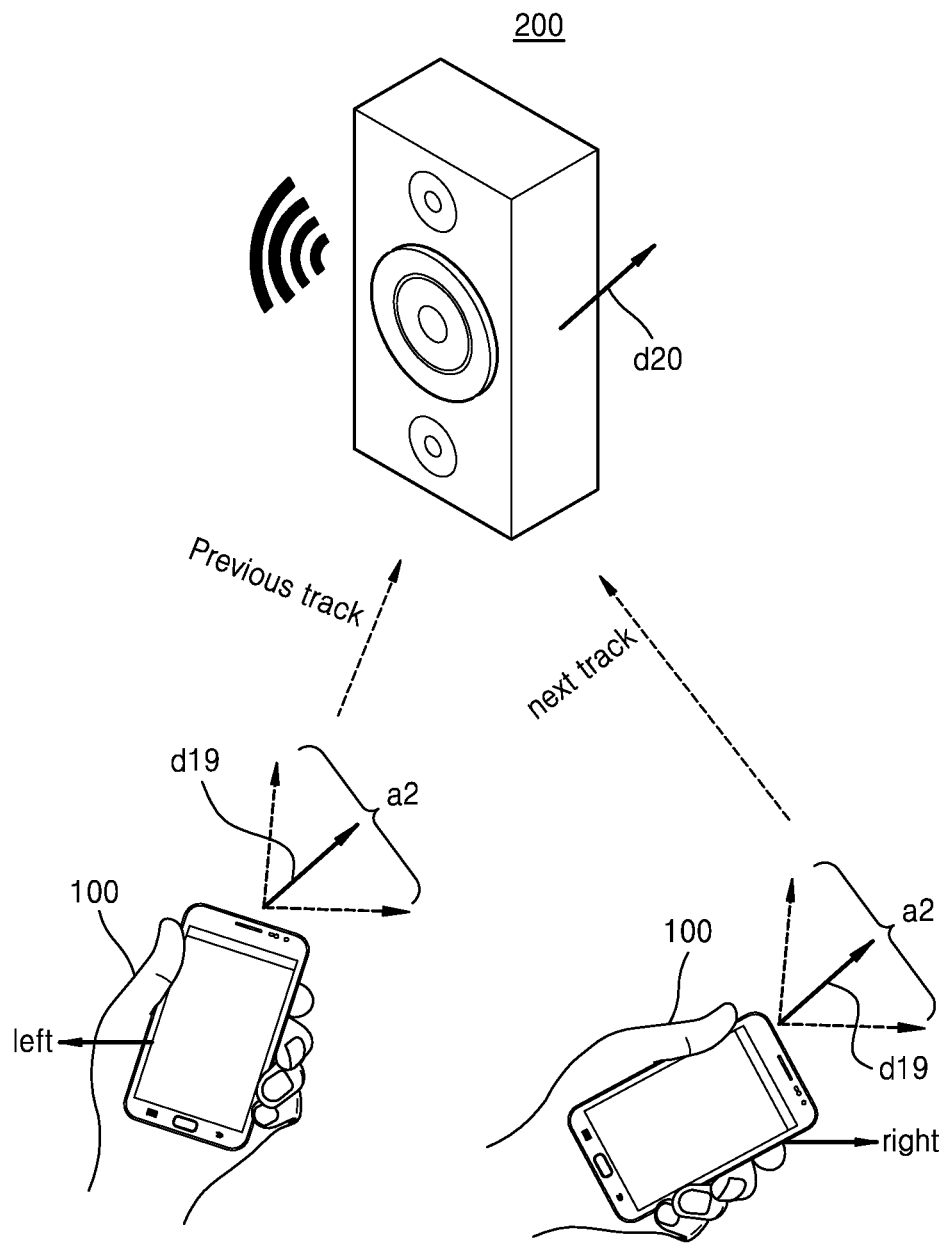

Furthermore, referring to FIGS. 12A and 12B, if the device 100 is arranged to point an azimuth (d19) and the sound reproducing device 200 is arranged to point an azimuth (d20), the device 100 and the sound reproducing device 200 may have azimuth information corresponding to each other. Here, a motion of the device 100 may be detected within a range a2 in which azimuth information regarding the device 100 corresponds to azimuth information regarding the sound reproducing device 200.

In operation S303 of FIG. 10, the control unit 180 of the device 100 may be configured to obtain information regarding a direction of a motion of the device 100.

For example, referring to FIG. 11A, the device 100 may obtain direction information regarding an upward motion within the range a1 in which azimuth information regarding the device 100 corresponds to azimuth information regarding the sound reproducing device 200.

Furthermore, referring to FIG. 11B, the device 100 may obtain direction information regarding a downward motion within the range a2 in which azimuth information regarding the device 100 corresponds to azimuth information regarding the sound reproducing device 200.

Furthermore, referring to FIG. 12A, the device 100 may obtain direction information regarding a leftward motion within the range a1 in which azimuth information regarding the device 100 corresponds to azimuth information regarding the sound reproducing device 200.

Furthermore, referring to FIG. 12B, the device 100 may obtain direction information regarding a rightward motion within the range a2 in which azimuth information regarding the device 100 corresponds to azimuth information regarding the sound reproducing device 200.

In operation S304 of FIG. 10, the control unit 180 of the device 100 may be configured to control at least one of functions including volume adjustment and change of sound files.

For example, referring to FIG. 11A, the device 100 may control the sound reproducing device 200 to increase volume based on the direction information regarding the upward motion.

Furthermore, referring to FIG. 11B, the device 100 may control the sound reproducing device 200 to increase volume based on the direction information regarding the downward motion.

Furthermore, for example, referring to FIG. 12A, the device 100 may control the sound reproducing device 200 to output sounds of a previous track file of a file being currently reproduced by the sound reproducing device 200 based on the direction information regarding the leftward motion.

Furthermore, referring to FIG. 12B, the device 100 may control the sound reproducing device 200 to output sounds of a next track file of the file being currently reproduced by the sound reproducing device 200 based on the direction information regarding the rightward motion.

According to an example, referring to FIGS. 10 through 12, while the device 100 is located to have azimuth information corresponding to that of the sound reproducing device 200, at least one of functions including volume adjustment and change of sound files may be controlled by moving the device 100 in designated directions (left, right, up, down, etc.).

Figure 13:
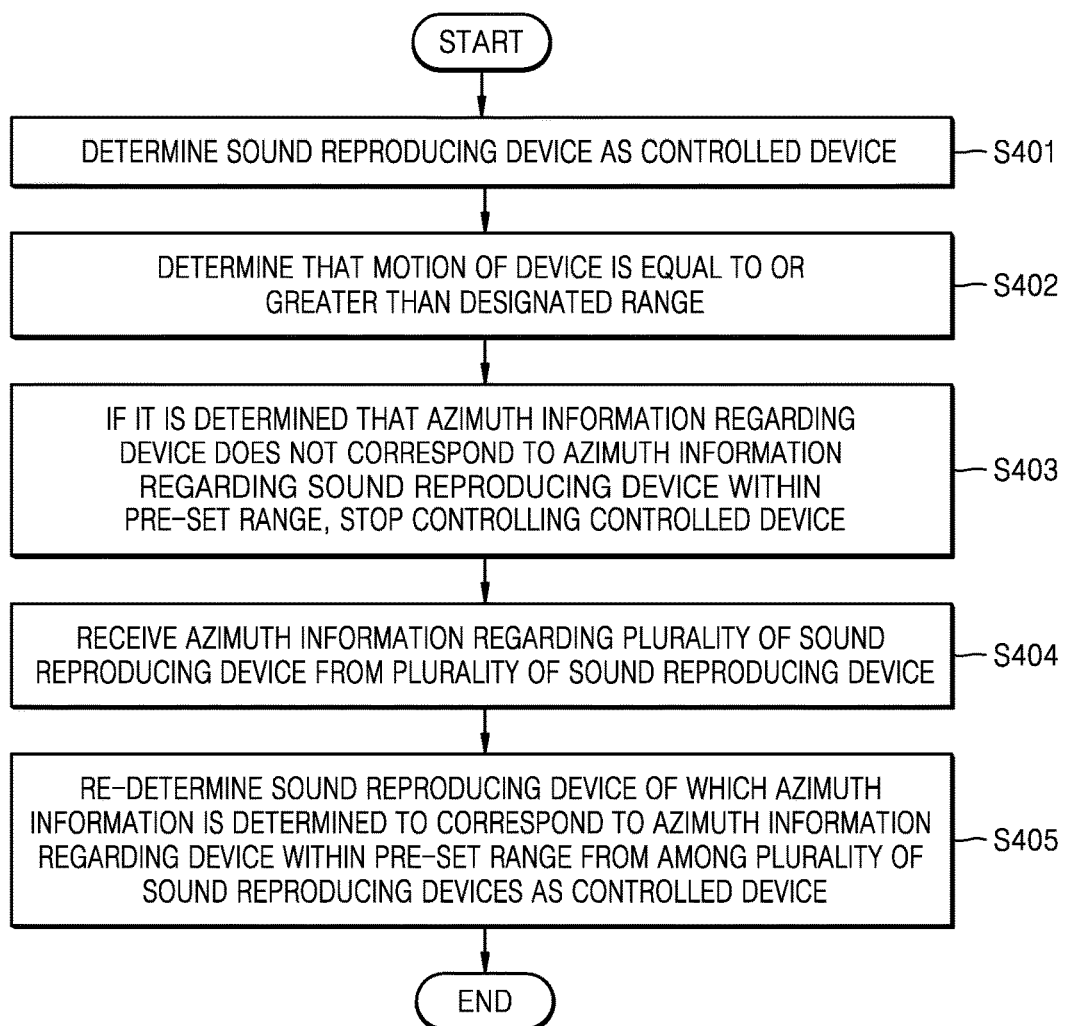
FIG. 13 is a flowchart illustrating an example in which azimuth information regarding a device is changed.

FIG. 13 is a flowchart illustrating an example in which azimuth information regarding the device 100 is changed. FIGS. 14A, 14B, 15A and 15B are diagrams illustrating examples in which azimuth information regarding the device 100 is changed.

In operation S401 of FIG. 13, the control unit 180 of the device 100 may be configured to determine a sound reproducing device as a controlled device.

According to an example, the device 100 may determine at least one sound reproducing device as a controlled device according to the flowchart shown, for example, in FIG. 5 or 7 and control sound output by the at least one sound reproducing device determined as the controlled device.

Figure 14A:
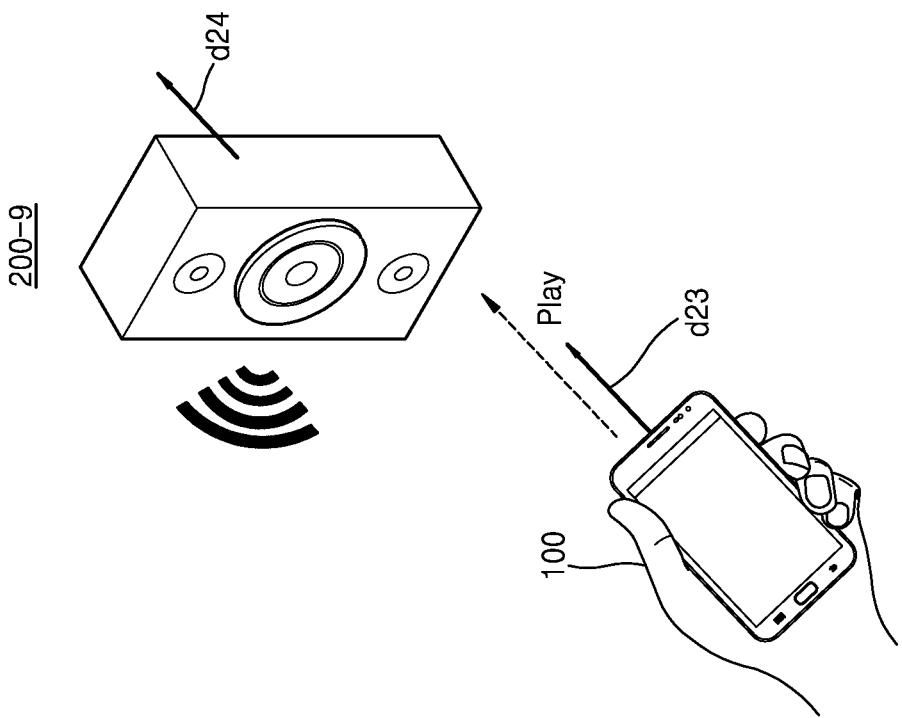
FIGS. 14A, 14B, 15A and 15B are diagrams illustrating examples in which azimuth information regarding a device is changed.

For example, referring to FIG. 14A, if azimuth information regarding an azimuth (d22) pointed by a first sound reproducing device 200-80 corresponds to azimuth information regarding an azimuth (d21) pointed by the device 100, the device 100 may determine the first sound reproducing device 200-8 as a controlled device.

Figure 15B:
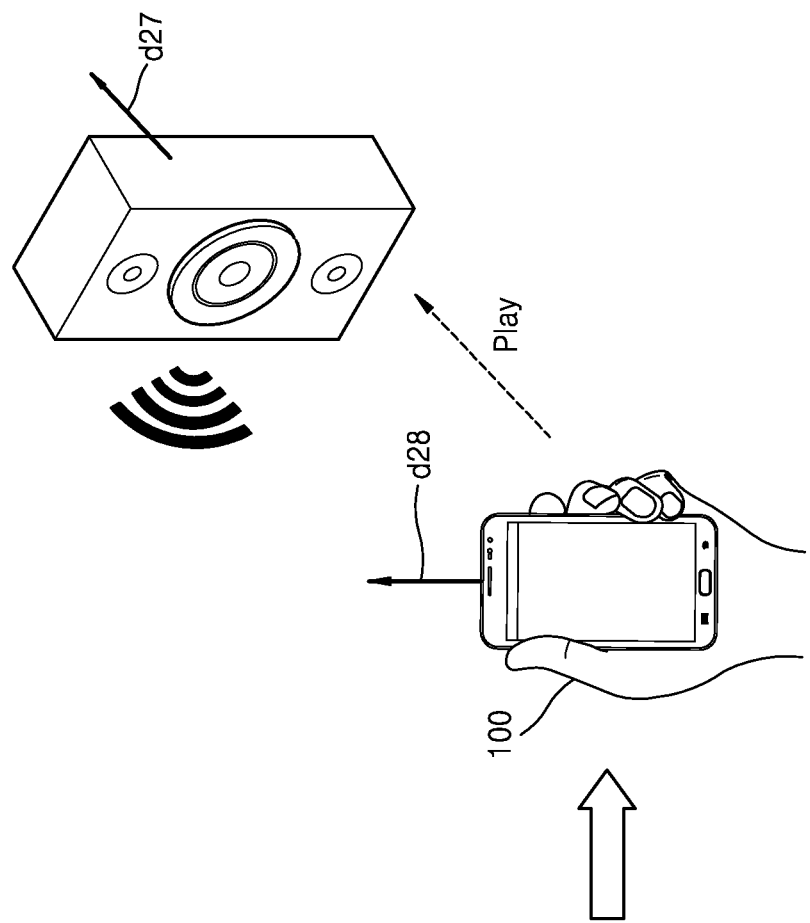
Figure 15A:
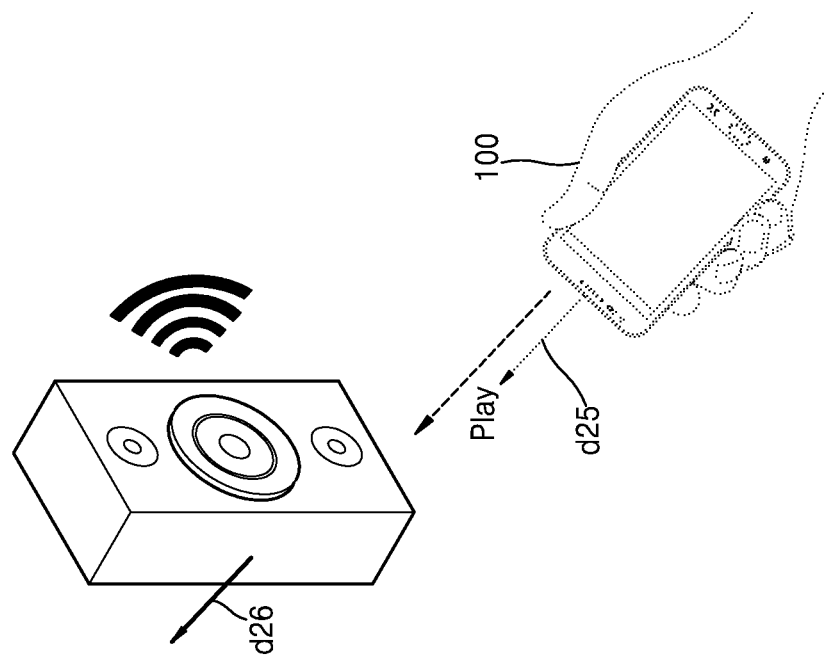

Furthermore, for example, referring to FIG. 15A, if azimuth information regarding an azimuth (d26) pointed by a first sound reproducing device 200-10 corresponds to azimuth information regarding an azimuth (d25) pointed by the device 100, the device 100 may determine the first sound reproducing device 200-10 as a controlled device.

In operation S402 of FIG. 13, the control unit 180 of the device 100 may be configured to determine that a motion of the device 100 is equal to or greater than a designated range.

According to an example, the control unit 180 of the device 100 may be configured to obtain information regarding a motion of the device 100 including a direction, a speed, and an angle of the motion of the device 100 via the sensing unit 140, including the acceleration sensor 142.

According to an example, if it is determined that a motion of the device 100 is equal to or greater than a designated range, the control unit 180 may be configured to obtain information regarding an azimuth pointed by the device 100 via the geomagnetic sensor 141.

Figure 14B:
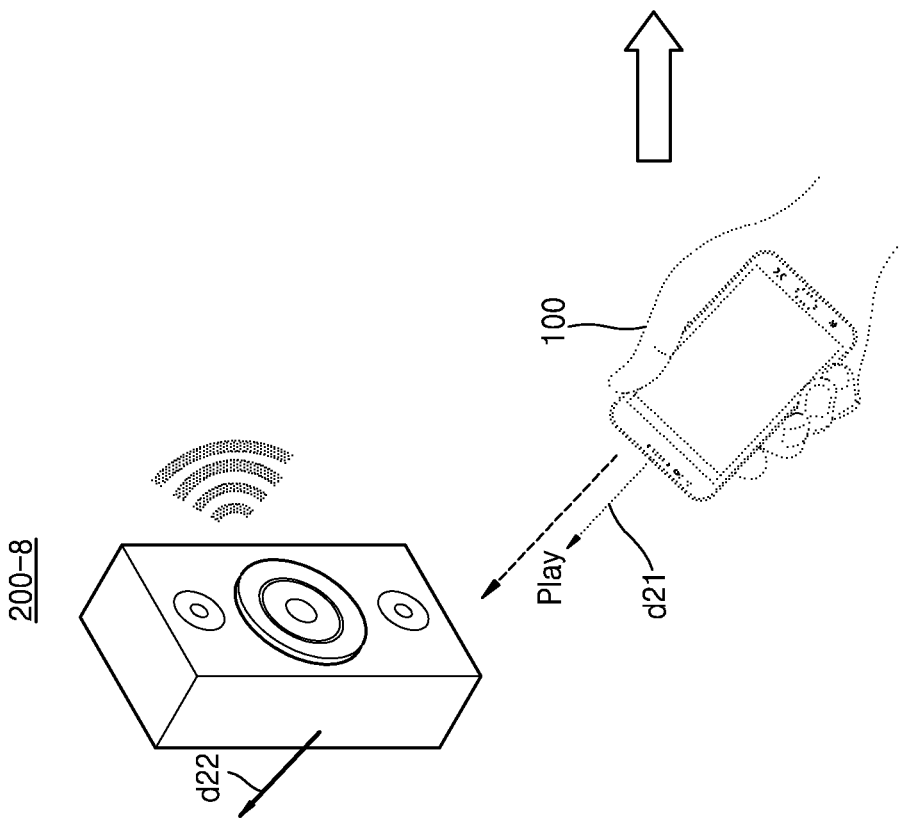

For example, referring to FIG. 14B, the device 100 may be moved to point an azimuth (d23). The control unit 180 of the device 100 may be configured to obtain azimuth information regarding the azimuth (d23) via the geomagnetic sensor 141.

Furthermore, referring to FIG. 15B, the device 100 may be moved to point an azimuth (d28). The control unit 180 of the device 100 may be configured to obtain azimuth information regarding the azimuth (d28) via the geomagnetic sensor 141.

In operation S403 of FIG. 13, if it is determined that azimuth information regarding the device 100 does not correspond to the information regarding azimuth information regarding the controlled device within the pre-set range, the control unit 180 of the device 100 may stop controlling the controlled device.

For example, referring to FIG. 14, as the device 100 moves toward the azimuth (d23), the control unit 180 may be configured to determine that azimuth information regarding the first sound reproducing device 200-8 determined as a controlled device does not correspond to azimuth information regarding the device 100 and stop controlling the first sound reproducing device 200-8.

Furthermore, referring to FIG. 15, as the device 100 moves toward the azimuth (d28), the control unit 180 may be configured to determine that azimuth information regarding the first sound reproducing device 200-10 determined as a controlled device does not correspond to azimuth information regarding the device 100 and stop controlling the first sound reproducing device 200-10.

In operation S404 of FIG. 13, the control unit 180 of the device 100 may be configured to receive azimuth information regarding a plurality of sound reproducing devices from the plurality of sound reproducing devices via the communication unit 150.

According to an example, the device 100 may receive azimuth information regarding a plurality of sound reproducing devices from the plurality of sound reproducing devices located within a designated communicable distance via a Bluetooth Low Energy (BLE) communication unit and a Wi-Fi (WLAN) communication unit.

For example, referring to FIG. 14, the device 100 may receive azimuth information regarding a sound reproducing device 200-9 from the sound reproducing device 200-9 that is located within a designated communicable distance via the communication unit 150.

Furthermore, referring to FIG. 15, the device 100 may receive azimuth information regarding a sound reproducing device 200-11 from the sound reproducing device 200-11 that is located within a designated communicable distance.

According to another example, the device 100 may omit the operation S404. For example, when a particular sound reproducing device is determined as a controlled device in the operation S401, the device 100 may receive azimuth information regarding a plurality of sound reproducing devices 200 from the plurality of sound reproducing devices 200 located within a designated distance and store the azimuth information. Therefore, azimuth information regarding the sound reproducing device 200-9 of FIG. 14 and azimuth information regarding the sound reproducing device 200-11 of FIG. 15 may be already stored in the device 100.

In operation S405 of FIG. 13, the control unit 180 of the device 100 may be configured to re-determine a sound reproducing device of which azimuth information is determined to correspond to the azimuth information regarding the device 100 within a pre-set range as a controlled device from among the plurality of sound reproducing devices.

For example, referring to FIG. 14, the device 100 may determine that azimuth information regarding an azimuth (d23) pointed by the device 100 corresponds to azimuth information regarding the sound reproducing device 200-9 and re-determine the sound reproducing device 200-9 as a controlled device.

According to another example, referring to FIG. 15, the device 100 may determine all of a plurality of sound reproducing devices 200-10 and 200-11 located within a designated distance from the device 100 with respect to information regarding a particular azimuth pointed by the device 100. For example, if the device 100 is moved to an azimuth (d28) toward the ceiling, the control unit 180 of the device 100 may determine both a first sound reproducing device 200-10 and a second sound reproducing device 200-11 as controlled devices and control the same to output sounds. Therefore, the multi-speaker output effect may be obtained.

Figure 16:
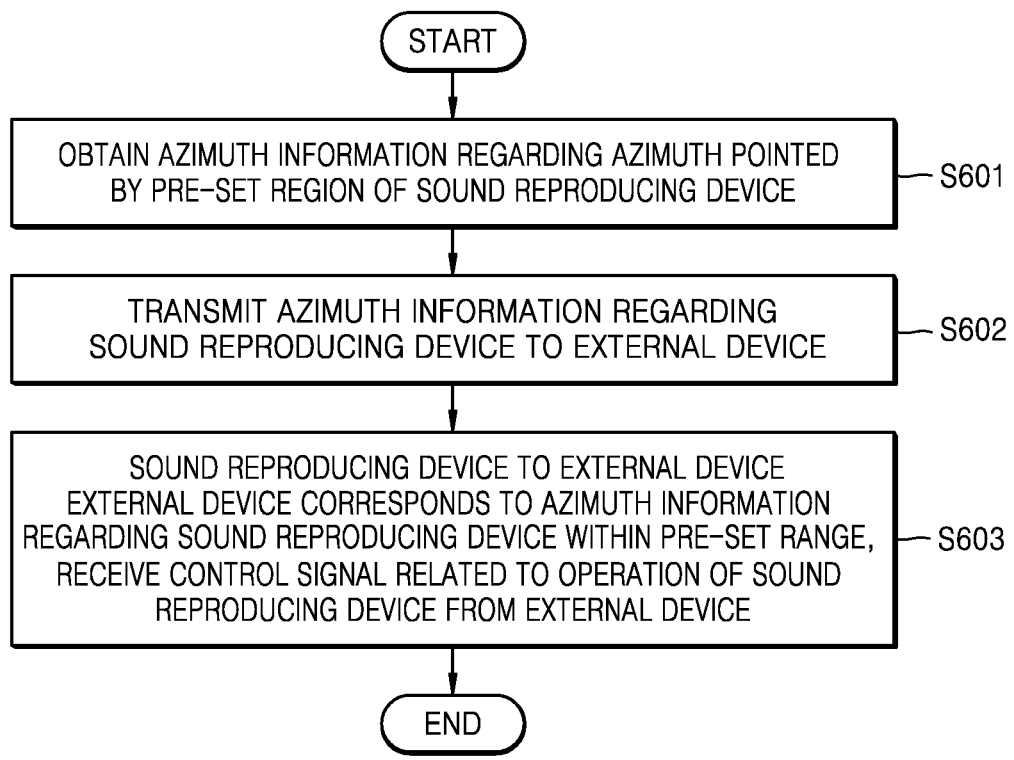
FIG. 16 is a flowchart illustrating an example method of controlling a sound reproducing device that receives control signals from an external device.

FIG. 16 is a flowchart illustrating an example method of controlling a sound reproducing device that receives control signals from an external device.

In operation S601 of FIG. 16, a control unit of the sound reproducing device 200 may be configured to obtain information regarding an azimuth pointed by a pre-set region of the sound reproducing device 200.

According to an example, the control unit of the sound reproducing device 200 may be configured to obtain information regarding an azimuth pointed by a rear surface of the sound reproducing device 200 via a sensing unit including the geomagnetic field sensor 204.

In operation S602 of FIG. 16, the control unit of the sound reproducing device 200 may be configured to transmit azimuth information regarding the sound reproducing device 200 to an external device.

According to an example, the communication unit including the Bluetooth module 210 and the Wi-Fi module 211 may transmit azimuth information regarding the sound reproducing device 200 obtained in the operation S601 to the external device 100.

In operation S603 of FIG. 16, as it is determined that azimuth information regarding the device 100 corresponds to the azimuth information regarding the sound reproducing device 200 within a designated range, the control unit of the sound reproducing device 200 may be configured to receive a control signal related to an operation of the sound reproducing device 200 from the device 100 via a communication unit.

For example, if it is determined that the azimuth information regarding the device 100 corresponds to the azimuth information regarding the sound reproducing device 200, the device 100 may transmit a control signal related to an operation of the sound reproducing device 200 to the sound reproducing device 200.

For example, the sound reproducing device 200 may receive a control signal related to at least one of functions including sound output, sound volume adjustment, and change of sound files to be reproduced from the device 100 located within a designated distance.

Figure 17:
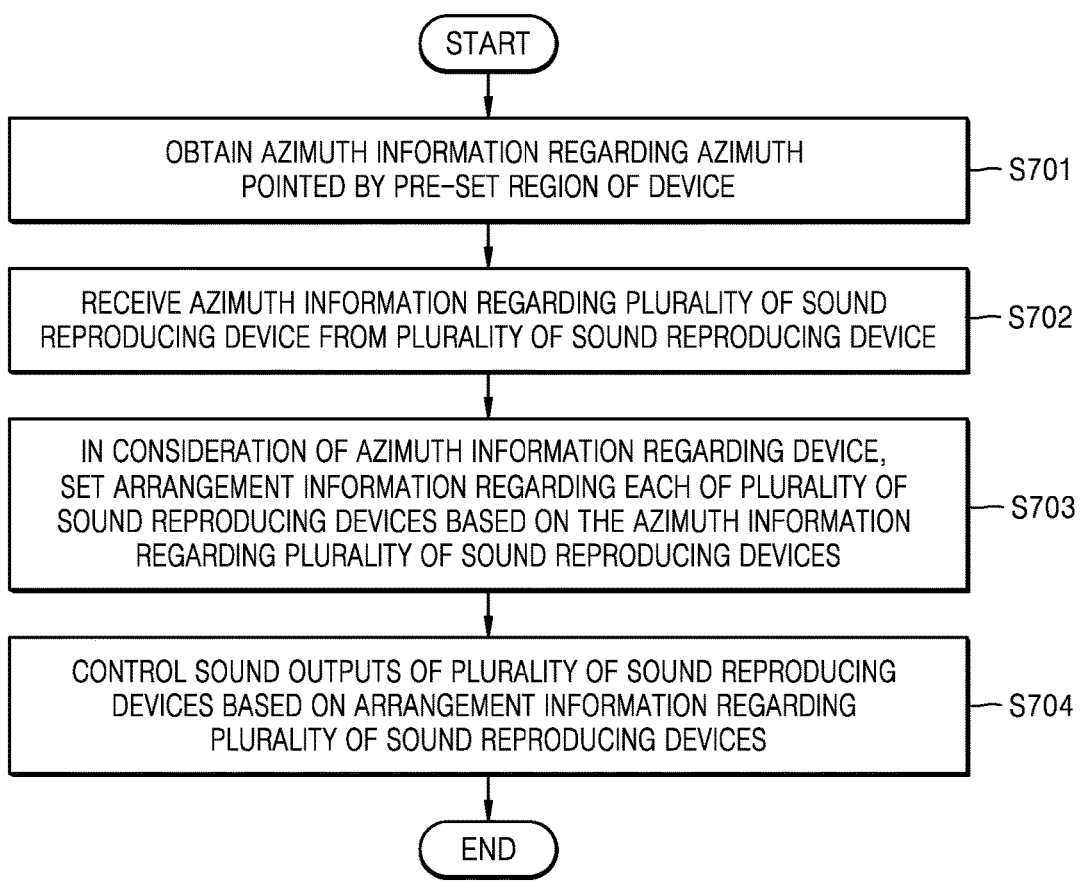
FIG. 17 is a flowchart illustrating an example of setting arrangement information regarding a plurality of sound reproducing devices.
Figure 18:
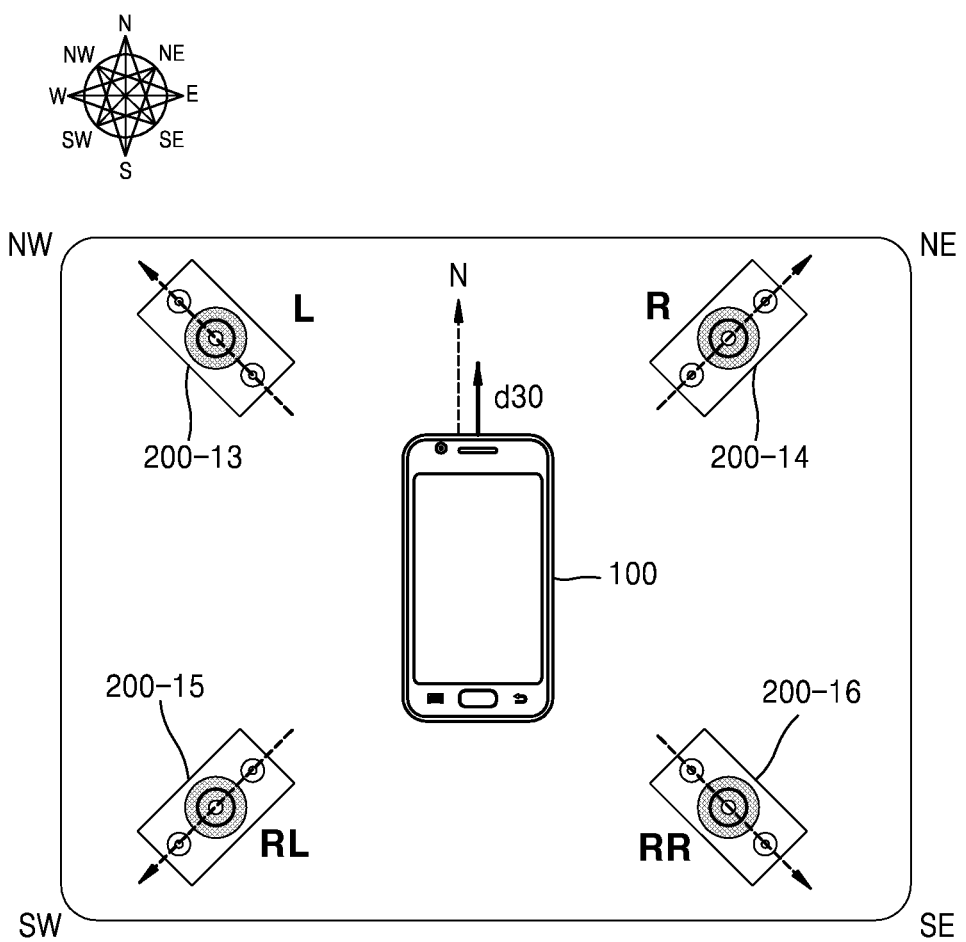
FIGS. 18 through 20 are diagrams illustrating an example of setting arrangement information regarding a plurality of sound reproducing devices.
Figure 19:
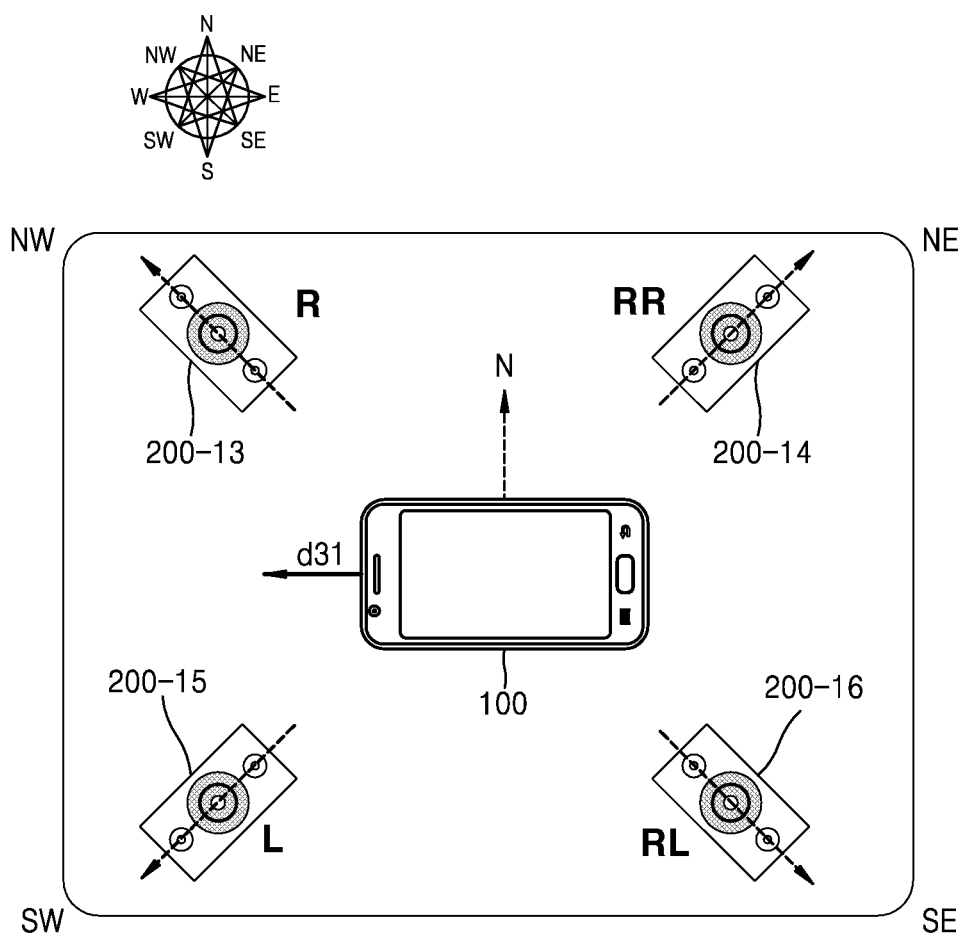
Figure 20:
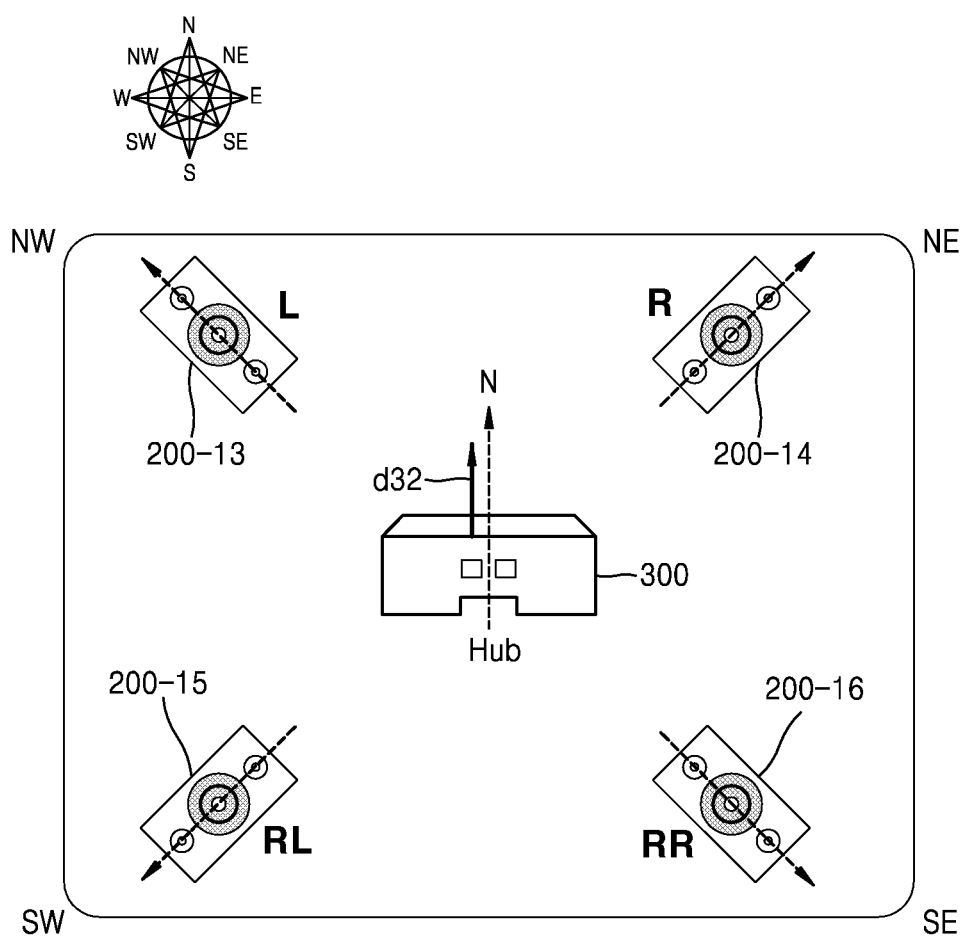

FIG. 17 is a flowchart illustrating an example of setting arrangement information regarding a plurality of sound reproducing devices. FIGS. 18 through 20 are diagrams illustrating an example of setting arrangement information regarding a plurality of sound reproducing devices.

In operation S701 of FIG. 17, the control unit 180 of the device 100 may be configured to obtain information regarding an azimuth pointed by a pre-set region of the device 100.

For example, referring to FIG. 18, the device 100 may obtain azimuth information regarding an azimuth (d30) pointed by the upper end portion of the device 100. For example, the azimuth information regarding the device 100 may indicate north (N).

Furthermore, referring to FIG. 19, the device 100 may obtain azimuth information regarding an azimuth (d31) pointed by the upper end portion of the device 100. For example, the azimuth information regarding the device 100 may indicate west (W).

In operation S702 of FIG. 17, the control unit 180 of the device 100 may be configured to receive azimuth information regarding a plurality of sound reproducing devices from the plurality of sound reproducing devices via the communication unit 150.

For example, the device 100 may receive azimuth information regarding a plurality of sound reproducing devices 200 from the plurality of sound reproducing devices 200 located within a designated communicable distance via a Bluetooth Low Energy (BLE) communication unit and a Wi-Fi (WLAN) communication unit. For example, referring to FIGS. 18 and 19, the device 100 may receive respective azimuth information from a plurality of sound reproducing devices 200-13, 200-14, 200-15, and 200-16.

In operation S703 of FIG. 17, the control unit 180 of the device 100 may be configured to set arrangement information regarding the respective sound reproducing devices based on azimuth information regarding the respective sound reproducing devices.

For example, referring to FIG. 18, by taking into account the azimuth information (north (N)) of the device 100, the control unit 180 of the device 100 may be configured to set arrangement information as left (L) based on azimuth information (NW) of a first sound reproducing device 200-13. Furthermore, the control unit 180 may be configured to set arrangement information as right (R) based on azimuth information (NE) of a second sound reproducing device 200-14. Furthermore, the control unit 180 may be configured to set arrangement information as rear-left (RL) based on azimuth information (SW) of a third sound reproducing device 200-15. Furthermore, the control unit 180 may be configured to set arrangement information as rear-right (RR) based on azimuth information (SE) of a fourth sound reproducing device 200-16.

Furthermore, for example, referring to FIG. 19, by taking into account the azimuth information (west (W)) of the device 100, the control unit 180 of the device 100 may be configured to set arrangement information as right (R) based on azimuth information (NW) of the first sound reproducing device 200-13. Furthermore, the control unit 180 may be configured to set arrangement information as rear-right (RR) based on azimuth information (NE) of the second sound reproducing device 200-14. Furthermore, the control unit 180 may be configured to set arrangement information as left (L) based on azimuth information (SW) of the third sound reproducing device 200-15. Furthermore, the control unit 180 may be configured to set arrangement information as rear-left (RL) based on azimuth information (SE) of the fourth sound reproducing device 200-16.

According to another example, referring to FIG. 20, arrangement information regarding a plurality of sound reproducing devices may be set in consideration of azimuth information (N) according to an azimuth (d32) pointed by the rear portion of a hub system 300 under the control of the hub system 300.

According to an example, as shown in FIG. 20, a wireless network multi-speaker system including a plurality of sound reproducing devices may be configured. Here, each of the sound reproducing devices 200-13, 200-14, 200-15, and 200-16 may be connected to an access point (AP) (not shown) in UPnP mode via the hub system 300 that is connected to the AP via a wire.

For example, the hub system 300 may recognize a plurality of devices (e.g., speakers, audios, PCs, intelligent consumer electronic devices, etc.) based on the UPnP, which is the interface specification for connecting various consumer electronic devices to a home network.

The hub system 300 may obtain TCP/IP addresses of a plurality of sound reproducing devices and receive identification information and azimuth information from the plurality of sound reproducing devices. By performing a pairing operation, the hub system 300 receives and stores unique identification information and azimuth information regarding each of sound reproducing devices.

Referring to FIG. 20, by taking into account the azimuth information (north (N)) of the hub system 300, the hub system 300 may set arrangement information as left (L) based on azimuth information (NW) of the first sound reproducing device 200-13. Furthermore, the hub system 300 may set arrangement information as right (R) based on azimuth information (NE) of the second sound reproducing device 200-14. Furthermore, the hub system 300 may set arrangement information as rear-left (RL) based on azimuth information (SW) of the third sound reproducing device 200-15. Furthermore, the hub system 300 may set arrangement information as rear-right (RR) based on azimuth information (SE) of the fourth sound reproducing device 200-16.

In operation S704 of FIG. 17, the control unit 180 of the device 100 may be configured to control sound outputs of the plurality of sound reproducing devices based on arrangement information regarding the plurality of sound reproducing devices.

For example, referring to FIG. 18, the control unit 180 of the device 100 may be configured to control the first sound reproducing device 200-13 arranged at a left location and the fourth sound reproducing device 200-16 arranged at a rear-left location to output sounds.

According to an example, as the device 100 automatically sets arrangement information regarding respective sound reproducing devices, an operation for a user to manually set arrangement information regarding the respective sound reproducing devices may be omitted. Furthermore, a user of the device 100 may more conveniently control a desired sound reproducing device from among a plurality of sound reproducing device to output sounds.

The above-stated examples are merely examples and should not be understood for purposes of limitation. Furthermore, the disclosure is not limited to the sequences of the operations in the flowcharts shown in FIGS. 5, 7, 10, 13, 16, and 17. Rather, it should be considered that some operations may be added or omitted thereto or the sequences may be partially modified according to various examples.

One or more examples may be implemented by a computer-readable recording medium, such as a program module executed by a computer. The computer-readable recording medium may be an arbitrary available medium accessible by a computer, and examples thereof include all volatile media and non-volatile media and separable and non-separable media. Furthermore, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

Furthermore, in the disclosure, the term "unit" may refer to a hardware component, such as a processor or a circuit, and/or a software component that is executed by a hardware component like a processor.

While the disclosure has presented and described with reference to examples thereof, it will be understood by those of ordinary skill in the art that various changes in form and details may be made therein without departing from the spirit and scope of the disclosure as defined by the following claims. Hence, it will be understood that the examples described above are not limiting the scope of the disclosure. For example, each component described in a single type may be executed in a distributed manner, and components described distributed may also be executed in an integrated form.

The scope of the disclosure is indicated by the claims which will be described in the following rather than the detailed description, and it should be understood that the claims and all modifications or modified forms drawn from the concept of the claims are included in the scope of the disclosure.

What is claimed is:

1. A control device for controlling a sound reproducing device, the control device comprising:
communication circuitry configured to transmit and receive data to and from the sound reproducing device;
a sensor; and
a controller configured to:
receive azimuth information regarding an azimuth representing a direction in which a pre-set region of the sound reproducing device is pointed, sensed by the sound reproducing device, from the sound reproducing device via the communication circuitry,
obtain azimuth information regarding an azimuth representing a direction in which a pre-set region of the control device is pointed, using the sensor,
determine whether the azimuth information regarding the control device is within a pre-set range of the received azimuth information regarding the sound reproducing device,
in response to determining the azimuth information regarding the control device being within the pre-set range of the received azimuth information regarding the sound reproducing device, determine the sound reproducing device as a controlled device to be controlled by the control device, and
transmit a control signal related to an operation of the sound reproducing device, to the determined sound reproducing device, the control signal being related to at least one of functions including sound output, sound volume adjustment, and/or change of sound files to be reproduced.

2. The control device of claim 1, wherein, when a plurality of azimuth information regarding a plurality of sound reproducing devices are received from the plurality of sound reproducing devices, the controller is configured to determine at least one sound reproducing device of which azimuth information is determined to correspond to the azimuth information regarding the device within the pre-set range from among the plurality of sound reproducing devices as the controlled device.

3. The control device of claim 1, wherein, the controller is configured to determine whether the azimuth information regarding the device corresponds to the azimuth information regarding the sound reproducing device within the pre-set range, when it is determined via the sensor that a motion of the device is equal to or greater than a designated range.

4. The control device of claim 1, wherein the controller is configured to control the sound reproducing device determined as the controlled device via the communication circuitry, to output sounds.

5. The control device of claim 1, wherein the controller is further configured to obtain information regarding a direction of the motion of the control device and to control at least one of functions including volume adjustment and change of sound files to be reproduced of the sound reproducing device determined as the controlled device, when a motion of the control device is detected by the sensor within a range in which the azimuth information regarding the device corresponds to azimuth information regarding the sound reproducing device.

6. The control device of claim 1, wherein, the controller is configured to stop controlling the sound reproducing device determined as the controlled device, when it is determined via the sensor that the motion of the control device is equal to or greater than a designated range and the azimuth information regarding the control device is out of the pre-set range based on the azimuth information regarding the sound reproducing device determined as the controlled device.

7. The control device of claim 6, wherein the controller is further configured to receive the azimuth information regarding a plurality of sound reproducing devices from the plurality of sound reproducing devices and to re-determine a sound reproducing device of which azimuth information is determined to correspond to the azimuth information regarding the device within a pre-set range from among the plurality of sound reproducing devices as the controlled device.

8. A sound reproducing device, for receiving control signals from a control device, the sound reproducing device comprising:
communication circuitry configured to receive a control signal from the control device;
a sensor configured to obtain azimuth information regarding an azimuth representing a direction in which a pre-set region of the sound reproducing device is pointed; and
a controller configured to transmit the azimuth information regarding the sound reproducing device to the control device via the communication circuitry and, to receive a control signal related to an operation of the sound reproducing device from the control device via the communication circuitry, when it is determined, by the control device, that azimuth information representing a direction in which a pre-set region of the control device is pointed is within a pre-set range of the azimuth information regarding the sound reproducing device, and
wherein the sound reproducing device is configured to receive a control signal related to an operation of the sound reproducing device, from the control device, the control signal being related to at least one of functions including sound output, sound volume adjustment, and/or change of sound files to be reproduced.

9. A control device for controlling a plurality of sound reproducing devices, the control device comprising:
communication circuitry configured to transmit and receive data to and from each of the plurality of sound reproducing devices;
a sensor; and
a controller configured to:
obtain azimuth information regarding an azimuth representing a direction in which a pre-set region of the control device is pointed, using the sensor,
receive, via the communication circuitry, azimuth information regarding an azimuth representing a direction in which a pre-set region of each of the plurality of sound reproducing devices is pointed,
based on the azimuth information regarding the control device relative to the azimuth information regarding each of the plurality of the sound reproducing devices, set arrangement information regarding each of the plurality of sound reproducing devices, wherein the arrangement information is based on a direction in which each of the plurality of sound reproducing devices is arranged relative to the control device and comprises at least one of left, right, front, and rear, and
transmit a control signal to each of the plurality of sound reproducing devices, the control signal being related to an operation of at least one of the plurality of sound reproducing devices and being related to at least one of functions including sound output, sound volume adjustment, and/or change of sound files to be reproduced.

10. A method for a control device to control a sound reproducing device, the method comprising:
receiving azimuth information regarding an azimuth representing a direction in which a pre-set region of the sound reproducing device is pointed, sensed by the sound reproducing device, from the sound reproducing device;
obtaining azimuth information regarding an azimuth representing a direction in which a pre-set region of the control device is pointed;
determining whether the azimuth information regarding the control device is within a pre-set range of the received azimuth information regarding the sound reproducing device;
in response to determining the azimuth information regarding the control device being within the pre-set range of the received azimuth information regarding the sound reproducing device, determining the sound reproducing device as a controlled device to be controlled by the control device, and
transmitting a control signal related to an operation of the sound reproducing device, to the determined sound reproducing device, the control signal being related to at least one of functions including sound output, sound volume adjustment, and/or change of sound files to be reproduced.

11. The method of claim 10, wherein, the receiving the azimuth information comprises the azimuth information regarding a plurality of sound reproducing devices being received from the plurality of sound reproducing devices, and,
wherein the determining the sound reproducing device as the controlled device comprises determining as the controlled device, a sound reproducing device of which azimuth information is determined to correspond to the azimuth information regarding the device within a pre-set range from among the plurality of sound reproducing devices.

12. The method of claim 10, wherein, it is determined whether the azimuth information regarding the device corresponds to the azimuth information regarding the sound reproducing device within a pre-set range when it is determined via the sensor that a motion of the device is equal to or greater than a designated range.

13. The method of claim 10, further comprising controlling the sound reproducing device determined as the controlled device via communication circuitry to output sounds.

14. The method of claim 10, further comprising:
   detecting a motion of the device within a range in which the azimuth information regarding the device corresponds to the azimuth information regarding the sound reproducing device;
   obtaining information regarding a direction of the motion of the device; and
   controlling at least one of functions including volume adjustment and change of sound files to be reproduced of the sound reproducing device determined as the controlled device.

15. The method of claim 10, further comprising, stopping control of the sound reproducing device determined as the controlled device when it is determined via the sensing unit that a motion of the device is equal to or greater than a designated range and the azimuth information regarding the device is out of the pre-set range based on the azimuth information regarding the sound reproducing device.

16. The method of claim 10, further comprising:
   receiving azimuth information regarding a plurality of sound reproducing devices from the plurality of sound reproducing devices; and
   re-determining a sound reproducing device of which azimuth information is determined to correspond to the azimuth information regarding the device within a pre-set range from among the plurality of sound reproducing devices as the controlled device.

17. A method for a control device to control a plurality of sound reproducing devices, the method comprising:
   obtaining azimuth information regarding an azimuth representing a direction in which a pre-set region of the control device is pointed;
   receiving azimuth information regarding an azimuth representing a direction in which a pre-set region of each of a plurality of sound reproducing devices is pointed;
   setting arrangement information regarding each of the plurality of sound reproducing devices based on each of the azimuth information regarding the plurality of sound reproducing devices relative to the azimuth information regarding the control device, wherein the arrangement information is based on a direction in which each of the plurality of sound reproducing devices is arranged relative to the control device and comprises at least one of left, right, front, and rear, and
   transmitting a control signal to each of the plurality of sound reproducing devices, the control signal being related to an operation of at least one of the plurality of sound reproducing devices and being related to at least one of functions including sound output, sound volume adjustment, and/or change of sound files to be reproduced.

* * * * *